(12) United States Patent
Kit et al.

(10) Patent No.: US 8,729,809 B2
(45) Date of Patent: May 20, 2014

(54) VOLTAGE REGULATING DEVICES IN LED LAMPS WITH MULTIPLE POWER SOURCES

(75) Inventors: John Kit, Brooklyn, NY (US); Georgiana Hsu, Bronx, NY (US)

(73) Assignee: DeNovo Lighting, LLC, Flushing, NY (US)

( * ) Notice: Subject to any disclaimer, the term of this patent is extended or adjusted under 35 U.S.C. 154(b) by 281 days.

(21) Appl. No.: 12/653,983

(22) Filed: Dec. 22, 2009

(65) Prior Publication Data

US 2011/0057572 A1    Mar. 10, 2011

Related U.S. Application Data

(60) Provisional application No. 61/276,095, filed on Sep. 8, 2009.

(51) Int. Cl.
    *H05B 37/02*    (2006.01)
(52) U.S. Cl.
    USPC .................................. 315/185 R; 315/185 S
(58) Field of Classification Search
    USPC ........................................ 315/185 R, 185 S
    See application file for complete search history.

(56) References Cited

U.S. PATENT DOCUMENTS

| | | |
|---|---|---|
| 4,211,955 A | 7/1980 | Ray |
| 4,460,863 A | 7/1984 | Conforti |
| 4,939,426 A | 7/1990 | Menard et al. |
| 5,552,678 A | 9/1996 | Tang et al. |
| 5,914,501 A | 6/1999 | Antle et al. |
| 5,939,839 A | 8/1999 | Robel et al. |
| 6,150,771 A | 11/2000 | Perry |
| 6,203,180 B1 | 3/2001 | Fleischmann |
| 6,323,598 B1 | 11/2001 | Guthrie et al. |
| 6,461,019 B1 | 10/2002 | Allen |
| 6,501,084 B1 | 12/2002 | Sakai et al. |
| 6,577,072 B2 | 6/2003 | Saito et al. |
| 6,590,343 B2 | 7/2003 | Pederson |
| 6,650,064 B2 | 11/2003 | Guthrie et al. |
| 6,760,380 B1 | 7/2004 | Andersen |
| 7,015,650 B2 | 3/2006 | McGrath |
| 7,053,560 B1 | 5/2006 | Ng |
| 7,157,859 B2 | 1/2007 | Inoue |
| 7,489,086 B2 | 2/2009 | Miskin et al. |
| 7,618,165 B2 | 11/2009 | Kamiya et al. |
| 2005/0174065 A1* | 8/2005 | Janning ........................ 315/185 S |
| 2006/0244396 A1* | 11/2006 | Bucur ............................ 315/312 |

OTHER PUBLICATIONS

U.S. Publication No. 2006/0261362 issued to Noda et al. on Nov. 23, 2006.

* cited by examiner

*Primary Examiner* — Douglas W Owens
*Assistant Examiner* — Jonathan Cooper
(74) *Attorney, Agent, or Firm* — Fox Rothschild LLP

(57) ABSTRACT

LED driver circuits containing voltage reducing devices, voltage regulating devices, and voltage converting devices are disclosed as the main components to provide power to LEDs. The LED driver circuits are designed to work with a ballast, mains alternating current voltage, direct current voltage, and electromagnetic induction power. The voltage regulating devices can be a resistor in series with at least one zener diode or a voltage regulator both in parallel with and providing power to the LEDs. The LEDs can also be anti-parallel diode pairs consisting of one diode and one LED or two LEDs, or the LEDs can be anti-parallel diode string pairs consisting of diodes and LEDs or all LEDs. The LED driver circuits will be incorporated into LED replacement lamps, and in particular to LED lamps to replace fluorescent lamps for use with existing ballasts and other power sources where the ballast may be removed or bypassed.

43 Claims, 8 Drawing Sheets

VOLTAGE REGULATING DEVICES IN LED LAMPS WITH MULTIPLE POWER SOURCES

RELATED PRIORITY APPLICATION

This application claims the benefit of priority of U.S. Provisional Application No. 61/276,095, filed on Sep. 8, 2009 and entitled, "Voltage Regulating Devices in LED Lamps with Multiple Power Sources", the entirety of which is incorporated herein by reference.

FIELD OF THE INVENTION

The present invention relates to driver circuits for light emitting diode illumination lamp devices powered by different types of power sources.

BACKGROUND OF THE INVENTION

There are many LED retrofit and replacement lamps in the market today. In particular, linear LED lamps are becoming more available by different manufacturers to replace fluorescent lamps using existing lampholders in fixtures. There are LED lamps that are powered by existing ballasts. There are LED lamps that are powered by direct line alternating current voltage mains power where the ballast and starter if present is bypassed or removed. There are LED lamps that are powered by a DC power supply or direct current voltage LED driver. Lastly, there are LED lamps that can be powered by electromagnetic induction. For each LED lamp and power source combination, a unique circuit is designed specifically to operate the LEDs with that particular power supply.

There becomes a need for one LED lamp with a circuit design that will work for multiple power sources. The one LED lamp will allow for reduced inventory and lower production costs. The use of voltage regulating devices along with other electrical components will allow the LED lamp to be used with ballast power, alternating current voltage or VAC mains power, direct current voltage or VDC power, and inductive transfer power.

Voltage regulating devices include the family of voltage regulators including but not limited to electromechanical regulators, DC voltage stabilizers, active regulators, linear series regulators, switching regulators, combination (hybrid) regulators, constant current regulators, DC-to-DC converter regulators, buck converter regulators, boost converter regulators, zener shunts, zener clamps, zener clippers, DC-to-AC converter regulators, inverters, etc.

The additional use of voltage reducing devices will allow the LED lamp to withstand high voltage surges from the ballast during startup, and voltage transients during normal operation of the LED lamp. These devices work with both AC and DC power. Several technologies are available to defend equipment against the damaging effects of power surges. These include devices which protect against excessive current, such as fuses and PTCs, and those that protect against excessive voltages, such as Sidactors, Tranzorbs, MOVs, glass discharge tubes, zener diodes, resistors, capacitors, inductors, varistors and spark gaps, just to name a few. No step-down transformers or capacitors in series with the power source will be used. This will allow the LED lamp device of the present invention to be used with the multiple power sources described.

The LED lamp device of the present invention can use different types of LEDs. High brightness LEDs are available in discrete radial lead lamps, or in surface mount SMD or SMT packages. Surface mount LEDs are semiconductor devices that have pins or leads that are soldered on the same side as the components. As a result there is no need for feed through holes where solder is applied on both sides of the circuit boards. Therefore, surface mount LEDs can be used on single sided boards and are mounted flat to the surface without angular offsets. They are usually smaller in package size, and the beam spreads are wider than discrete radial lead LED lamps.

OLEDs or organic light emitting diodes are an up and coming technology for illumination lamp devices. An organic light emitting diode (OLED), also light emitting polymer (LEP), and organic electro luminescence (OEL), is an LED whose emissive electroluminescent layer is composed of a film of organic compounds. The layer usually contains a polymer substance that allows suitable organic compounds to be deposited. They are deposited in rows and columns onto a flat carrier by a simple "printing" process. The resulting matrix of pixels can emit light. OLEDs can be used in light sources for general space illumination and large area light emitting elements. OLEDs typically emit less light per area than inorganic solid-state based LEDs that are usually designed for use as point-light sources.

An LED or light emitting diode is a special diode that emits light when DC power is applied. Each LED can be arranged in an anti-parallel connection with another diode or another LED as a single pair or as part of a pair of anti-parallel diode strings. Each anti-parallel serial string of at least one diode pair is in series with a current limiting device such as a resistor or a capacitor. The current limiting capacitor can be used for AC voltages, but will block DC power to the LEDs. Therefore, the resistor is a preferred device for the present invention, because it will allow both AC and DC voltages to pass to the series string of anti-parallel diode pairs.

An anti-parallel connection has at least two diodes connected to each other in opposing parallel relation, at least one or both such diodes are each an LED. The diode pairs are connected in parallel such that an anode of a first diode in the pair is electrically connected to the cathode of the other second diode in the pair, and the anode of the second diode is electrically connected to the cathode of the first diode in the pair. One of each pair of diodes is thus forward biased to produce light regardless of the instantaneous polarity of electrical current supplied to the diode pair by the power source. The anti-parallel diode pairs can also consist of at least two anti-parallel diode strings separated into two separate diode strings that can conduct in opposite electrical directions. Within each anti-parallel diode string pair, a same number of diodes are electrically connected with each number of diodes that can conduct in a different electrical direction. A current limiting resistor is connected to the anti-parallel diode string pair at one point and the value of the resistor is selected to reduce the input power to activate one of the two diode strings in the anti-parallel diode string pair one at a time. At least one or all diodes in each anti-parallel diode string pair is each an LED.

Besides using individual and discrete components in most implementation of the invention, the diodes in each pair will be normal single-die LEDs. Another aspect of the invention provides, however for a multi-die LED such that the diode pair comprises at least two LED dies mounted with reverse polarity within a single LED casing. It should be noted that "package" or "packaged" or "PCB" is defined herein as an integrated unit meant to be used as a discrete component in either of the manufacture, assembly, installation, or modification of an LED lighting device or system.

Such a package includes LEDs of desired characteristics in series with current limiting resistors sized relative to the specifications of the chosen opposing parallel diodes and with respect to a predetermined AC voltage and frequency. The Acriche Emitter type is a discrete AC LED and the Acriche PCB type is an AC LED package that is offered by Seoul Semiconductor as the world's first AC-driven semiconductor lighting sources.

DESCRIPTION OF THE RELATED ART

There are many references that contain designs for providing power to one or more LEDs in use with either a zener diode or other voltage regulating device, but none of them use the voltage regulators in combination with voltage reducing devices to work with multiple power sources as disclosed in this specification. The combination of both components offers an improvement over the references and offers an LED lamp device that can truly operate with multiple power sources.

U.S. Pat. No. 4,211,955 issued to Ray on Jul. 8, 1980 discloses a Solid State Lamp containing a rectifier and voltage regulator circuit. One embodiment of the invention includes a half wave diode rectifier and regulating means in the form of a resistor and a zener diode. His invention relies on the regulator circuit to protect against transients. In contrast, the present invention uses separate voltage reduction means to protect the electrical elements and LEDs from an overvoltage surge condition either from a ballast during startup or from voltage transients during normal operation of the LED lamp.

U.S. Pat. No. 4,460,863 issued to Conforti on Jul. 17, 1984 discloses a battery charging circuit with a zener diode and one LED in series and uses a step-down transformer to drop the higher input VAC to a lower output VAC. The present invention does not use a transformer, because it is not needed. The entire input power is utilized and VAC or VDC is used to provide power to the LEDs and other electrical components.

U.S. Pat. No. 5,939,839 issued to Robel et al. on Aug. 17, 1999 discloses circuits for protecting LEDs for illumination or signaling purposes, and uses a PTC resistor in series with a zener diode and a plurality of LEDs. The use of a PTC will cause all LEDs to turn off when there is an over-current condition, and will turn all the LEDs back on after the over-current condition is removed. This is not desirable in a lamp illumination system. The embodiments of the present invention do not use PTC resistors and therefore allows the LEDs to remain on at all times as long as input power is present. In the specification of U.S. Pat. No. 5,939,839, the zener diode together with the PTC resistor protects the LEDs against positive over voltage. In an embodiment of the present invention, a high power current limiting resistor together with at least one zener diode along with a varistor or similar voltage reducing device connected at the source of input power protects the LEDs against positive over voltage.

U.S. Pat. No. 6,150,771 issued to Perry on Nov. 21, 2000 discloses an interface circuit for a traffic signal with LEDs to replace incandescent bulbs. Their invention uses a sensing and switching circuit including conflict monitors to provide a power factor of substantially unity. In contrast, in one embodiment of the present invention, a purely resistive load is used to provide a linear current to a zener diode and the series string of LEDs load that induces no changes onto an incoming AC power line for a smoother transfer of power to the LEDs.

U.S. Pat. No. 6,203,180 issued to Fleischmann on Mar. 20, 2001 discloses a power supply unit for a lighting arrangement that includes at least one LED connected in parallel or in series to the power supply unit with a zener diode connected in parallel to each LED or to a group of LEDs. The lighting arrangement comprises a plurality of spot light sources each comprising at least one LED with each LED fixed in holders. The preferred embodiments of the present invention in contrast, use no holders for the LEDs. The LEDs are mounted directly to circuit boards. In addition, voltage reducing devices are used to protect the electrical components and LEDs from an overvoltage surge condition either from a ballast during startup or from voltage transients during normal operation of the LED lamp.

U.S. Pat. No. 6,323,598 issued to Guthrie et al. on Nov. 27, 2001 discloses an LED driver for voltage-controlled dimming of at least two LED groups and a switching circuit between the two LED groups. In contrast, an embodiment of the present invention uses only one zener diode in parallel with a single series string of LEDs. In addition, voltage reducing devices are used to protect the electrical components and LEDs from an overvoltage surge condition either from a ballast during startup or from voltage transients during normal operation of the LED lamp.

U.S. Pat. No. 6,501,084 issued to Sakai et al. on Dec. 31, 2002 discloses a UV lamp unit consisting of LEDs on a circuit board using a zener diode in parallel with a group of LED strings. However, it doesn't disclose voltage reducing devices to protect the electrical components and LEDs from an overvoltage condition either from a ballast during startup or from voltage transients during normal operation.

U.S. Pat. No. 6,577,072 issued to Saito et al. on Jun. 10, 2003 discloses a power supply and LED lamp device that primarily uses an oscillator to drive the LEDs. When a zener diode is used, the zener voltage is higher than the total of the forward voltage drops of the LEDs connected in parallel with the zener diode within a range of from 10% to 30% both inclusive. A first embodiment of the present invention uses a zener diode with a rated voltage less than 10% above the total of the forward voltage drops of the series string of LEDs, which is below the inclusive range of 10% to 30% as claimed by U.S. Pat. No. 6,577,072.

U.S. Pat. No. 6,590,343 issued to Pederson on Jul. 8, 2003 discloses a compensating circuit including a zener diode that adjusts the electrical parameters for a plurality of LEDs for inclusion within standardized specifications for the electrical system of a light fixture. Their invention further discloses a controller and software for use with the compensating circuit. In contrast, there is no controller used in the embodiments of the present invention. Input power is used to provide DC voltage to power the series string of LEDs using a constant voltage zener diode or a high voltage regulator IC.

U.S. Pat. No. 6,650,064 issued to Guthrie et al. on Nov. 18, 2003 discloses a zener diode connected in parallel with two or more sets of series connected LEDs in a reverse forward bias orientation. In contrast, the embodiments of the present invention use at least one zener diode with at least one series string of LEDs. In addition, voltage reducing devices are used to protect the electrical components and LEDs from an overvoltage surge condition either from a ballast during startup or from voltage transients during normal operation of the LED lamp.

U.S. Pat. No. 7,157,859 issued to Inoue on Jan. 2, 2007 discloses a lighting device and lighting system that use more than one zener diode each with a series resistor in parallel with respective LEDs and each LED also having a series resistor. One embodiment of the present invention uses only one zener diode with one series string of LEDs. Lastly, voltage reducing devices are used to protect the electrical components and LEDs from an overvoltage surge condition either from a ballast during startup or from voltage transients during normal operation of the LED lamp.

U.S. Pat. No. 4,939,426 issued to Menard et al. on Jul. 3, 1990; U.S. Pat. No. 5,552,678 issued to Tang et al. on Sep. 3, 1996; U.S. Pat. No. 5,914,501 issued to Antle et al. on Jun. 22, 1999; U.S. Pat. No. 6,461,019 issued to Allen on Oct. 8, 2002; U.S. Pat. No. 6,760,380 issued to Andersen on Jul. 6, 2004; U.S. Pat. No. 7,015,650 issued to McGrath on Mar. 21, 2006; U.S. Pat. No. 7,053,560 issued to Ng on May 30, 2006; U.S. Pat. No. 7,489,086 issued to Miskin et al. on Feb. 10, 2009; U.S. Pat. No. 7,618,165 issued to Kamiya et al. on Nov. 17, 2009; and U.S. Patent Application Publication Number 2006/0261362 published on Nov. 23, 2006 among others are provided for reference.

SUMMARY OF THE INVENTION

An LED lamp device is disclosed primarily for the replacement of fluorescent lamps. The LED lamp contains circuitry to allow it to be used with multiple power sources providing versatility to the end user, and reducing material and inventory costs. The LED lamp terminates primarily in G13 bi-pins on opposing end caps. However, other pin terminating lamp bases will be possible to mate with the different types of fluorescent tube lampholders. The LED lamp mates with the existing lampholders on a new or existing fluorescent fixture. The body of the LED lamp is tubular, with the LEDs and other electrical components positioned within the LED lamp housing that are in electrical communications with the bi-pins. The bi-pins ultimately transfer power from the multiple input power sources to the LEDs.

Although the patent is primarily for an LED fluorescent replacement lamp, the same circuitry can be used for other types of LED replacement lamps as well. These include LED lamp devices to replace tungsten filament, halogen, incandescent, HID, metal halide, ceramic discharge lamps, etc. in various lamp packages and housings.

A first embodiment of the present invention uses a voltage regulating zener diode to set the voltage applied to a series string of LEDs. This shunt regulator can include a zener diode, avalanche breakdown diode, or a TVS or transient voltage suppressor. A high power current limiting resistor is connected in series with the zener diode. The zener diode is connected in parallel with the series string of LEDs. More than one zener diode may be used. There may be one zener diode in parallel with one or more LEDs, or one or more series string of LEDs. This is done to maintain illumination from the LED lamp in case one or more LEDs should fail.

External power from a ballast, VAC, VDC, or electromagnetic induction power immediately passes from the bi-pins to an AC-to-DC converter. The VDC power is filtered through a capacitor and a bleeder resistor. The VDC power then passes through the high power current limiting resistor and zener diode that subsequently sets the voltage and current going to the series string of LEDs. The zener voltage is distributed evenly over each LED in the series string of LEDs.

Since the LED lamp is non-polarized, it can be installed without any direction or specific position to the mating lampholders. To accomplish this, an optional and identical AC-to-DC converter, filter capacitor, and bleeder resistor is included at the opposite end of the LED lamp with the positive and negative outputs of both AC-to-DC converters tied together respectively within the LED lamp.

A varistor or similar voltage reducing device that is positioned across the bi-pins of the LED lamp is strongly recommended. The varistor will protect the LED lamp electronics from voltage surges during ballast startup and from voltage transients during normal operation of the LED lamp.

A second embodiment of the present invention uses a high voltage regulator IC to set the voltage applied to a series string of LEDs. Such high voltage regulator ICs includes the family of TV hybrid voltage regulator ICs, DC-DC converters, buck converters, or similar voltage regulating devices. A smoothing capacitor is used at the input of the high voltage regulator IC, and a resistor bridge sets the base voltage to the high voltage regulator IC. The output of the high voltage regulator IC is connected to an optional current limiting resistor in series with a string of LEDs. More than one high voltage regulator IC may be used. There may be one high voltage regulator IC in parallel with one or more LEDs, or one or more series string of LEDs. This is done to maintain illumination from the LED lamp in case one or more LEDs should fail.

External power from a ballast, VAC, VDC, or electromagnetic induction power immediately passes from the bi-pins to an AC-to-DC converter. The VDC power enters the high voltage regulator IC. The regulated VDC is filtered through a capacitor and a bleeder resistor, and passes through the optional current limiting resistor and series string of LEDs. The high voltage regulator IC sets the voltage and current going to the series string of LEDs. The regulated high voltage DC is distributed evenly over each LED in the series string of LEDs.

Since the LED lamp is non-polarized, it can be installed without any direction or specific position to the mating lampholders. To accomplish this, an optional and identical AC-to-DC converter, and optional filter capacitor and bleeder resistor is included at the opposite end of the LED lamp with the positive and negative outputs of both AC-to-DC converters tied together respectively within the LED lamp.

A varistor or similar voltage reducing device that is positioned across the bi-pins of the LED lamp is strongly recommended. The varistor will protect the LED lamp electronics from voltage surges during ballast startup and from voltage transients during normal operation of the LED lamp.

A third embodiment of the present invention uses back-to-back voltage regulating zener diodes to set the voltage applied to a series string of paired sets of diodes each connected in an anti-parallel configuration, or to a pair of diode strings connected in an anti-parallel configuration. This clamp or clipper regulator can include two zener diodes, two avalanche breakdown diodes, or two TVS or transient voltage suppressors. A high power current limiting resistor is connected in series with the back-to-back zener diodes. The back-to-back zener diodes are connected in parallel with the series string of anti-parallel diode pairs or anti-parallel pair of diode strings. Each series string of anti-parallel diode pairs or anti-parallel pair of diode strings may contain a current limiting resistor. More than one pair of back-to-back zener diodes may be used. There may be one pair of back-to-back zener diodes in parallel with one or more anti-parallel diode pairs, or one or more series strings of anti-parallel diode pairs. One diode in each pair or one diode in each string can be an LED, or both diodes in each anti-parallel diode pair or each anti-parallel diode string pair can be LEDs. This configuration maintains illumination from the LED lamp in case one or more LEDs should fail.

External power from a ballast, VAC, VDC, or electromagnetic induction power immediately passes from the bi-pins to an optional DC-to-AC converter or an inverter. The DC-to-AC converter or an inverter is optional since both VAC and VDC will still pass onto the anti-parallel diode pairs or anti-parallel diode string pairs. The VAC power then passes through the high power current limiting resistor and the back-to-back zener diodes that subsequently set the voltage and current going to the series string of anti-parallel diode pairs or anti-parallel diode string pairs. The total back-to-back zener voltage is distributed evenly over each diode or LED in the anti-parallel diode pairs in the series string of anti-parallel diode pairs, or over each diode or LED in the anti-parallel diode strings.

Since the LED lamp is non-polarized, it can be installed without any direction or specific position to the mating lampholders. To accomplish this, an optional and identical DC-to-AC converter or inverter is included at the opposite end of the LED lamp with the positive and negative inputs of both DC-to-AC converters or inverters tied together respectively within the LED lamp. DC power and AC power will still pass to the anti-parallel diode pairs or anti-parallel diode string pairs without the DC-to-AC converter or inverter in place.

A varistor or similar voltage reducing device that is positioned across the bi-pins of the LED lamp is strongly recommended. The varistor will protect the LED lamp electronics from voltage surges during ballast startup and from voltage transients during normal operation of the LED lamp.

A fourth embodiment of the present invention uses back-to-back voltage regulating zener diodes to set the voltage applied to at least one packaged AC LED PCB connected in parallel. This clamp or clipper regulator can include two zener diodes, two avalanche breakdown diodes, or two TVS or transient voltage suppressors. A high power current limiting resistor is connected in series with the back-to-back zener diodes. The back-to-back zener diodes are connected in parallel with at least one packaged AC LED PCB. The packaged AC LED PCB may contain a current limiting resistor. More than one pair of back-to-back zener diodes may be used. There may be one pair of back-to-back zener diodes in parallel with one or more packaged AC LED PCBs. This is done to maintain illumination from the LED lamp in case one or more packaged AC LED PCBs should fail.

External power from a ballast, VAC, VDC, or electromagnetic induction power immediately passes from the bi-pins to an optional DC-to-AC converter or an inverter. The DC-to-AC converter or an inverter is optional since both VAC and VDC will still pass onto the packaged AC LED PCBs. The VAC power then passes through the high power current limiting resistor and the back-to-back zener diodes that subsequently set the voltage and current going to the packaged AC LED PCBs. The back-to-back zener voltage is the same over each packaged AC LED PCB.

Since the LED lamp is non-polarized, it can be installed without any direction or specific position to the mating lampholders. To accomplish this, an optional and identical DC-to-AC converter or inverter is included at the opposite end of the LED lamp with the positive and negative inputs of both DC-to-AC converters or inverters tied together respectively within the LED lamp. DC power and AC power will still pass to the anti-parallel diode pairs without the DC-to-AC converter or inverter in place.

A varistor or similar voltage reducing device that is positioned across the bi-pins of the LED lamp is strongly recommended. The varistor will protect the LED lamp electronics from voltage surges during ballast startup and from voltage transients during normal operation of the LED lamp.

OBJECT OF THE INVENTION

It is an object of the present invention to minimize inventory costs.

It is another object of the present invention to minimize electrical components to reduce overall material cost.

It is yet another object of the invention to provide circuitry and electrical components for a versatile LED lamp device that can be used with multiple sources of input power.

While the novel features of the invention are set forth particularly in the appended claims, the invention, both as to organization and content, will be better understood and appreciated along with other objects and features thereof, from the following detailed description taken in conjunction with the drawings.

The foregoing has outlined rather broadly the features and technical advantages of the present invention, so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

DETAILED DESCRIPTION OF THE PREFERRED EMBODIMENTS

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

FIGS. 1 to 8, discussed below and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
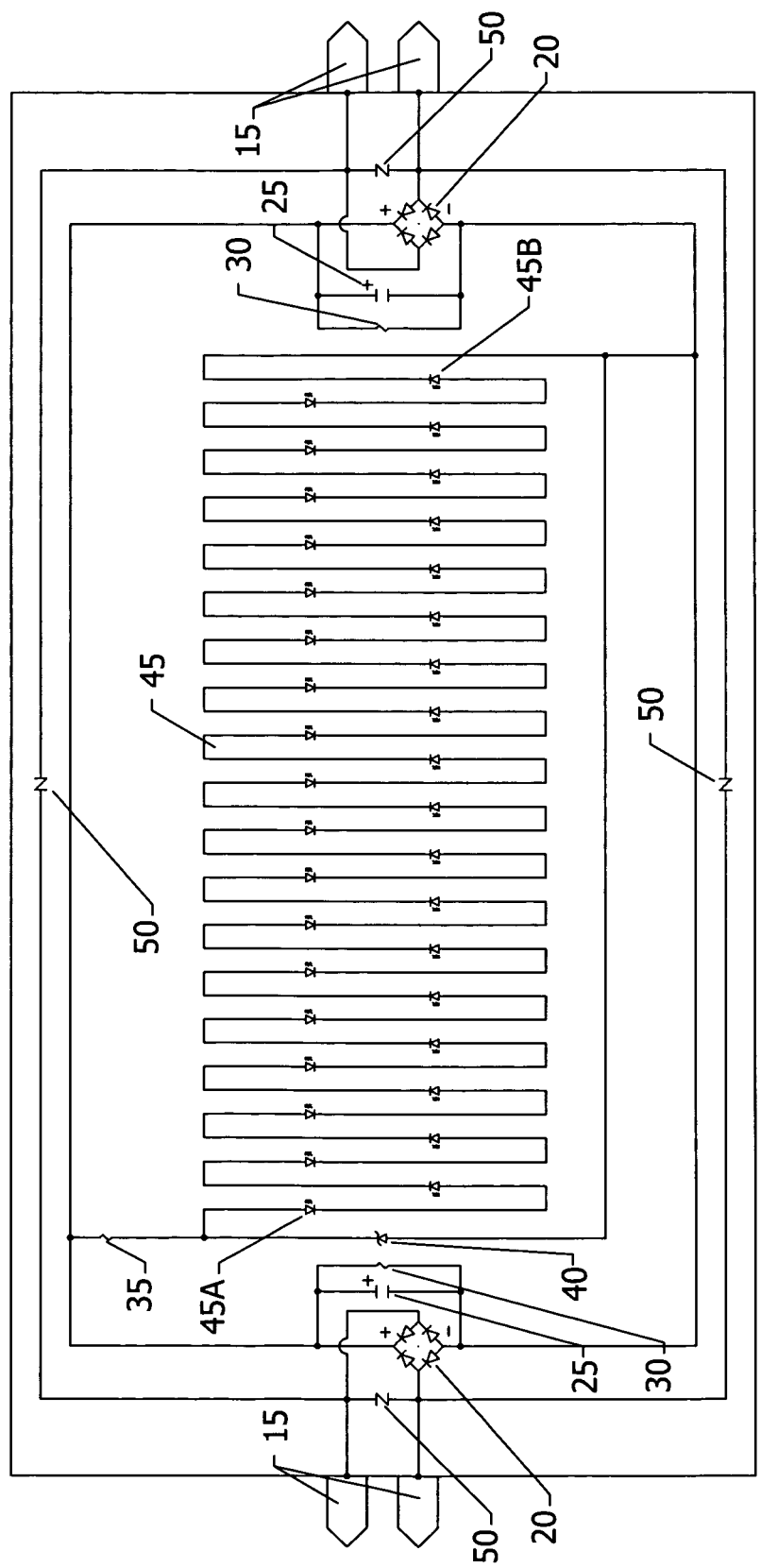
FIG. 1 shows a first embodiment of the present invention using a single resistor and zener diode as the main voltage regulating device in parallel with at least one LED.

FIG. 1 shows a first embodiment of the present invention using a high power current limiting resistor 35 and a zener diode 40 as the main voltage regulating device to provide power to a series string of LEDs 45. LED lamp 10 is shown with bi-pins 15 on opposite ends of LED lamp 10. On both ends, bi-pins 15 are connected to the AC sides of AC-to-DC converters 20. The positive sides of AC-to-DC converters 20 are connected together. The positive sides are also filtered through capacitors 25 and bleeder resistors 30, and then passes through high power current limiting resistor 35 connected in series with zener diode 40 and series string of LEDs 45. Voltage reducing devices 50 may be connected to the bi-pins 15 of LED lamp 10.

The actual AC-to-DC converter 20 used is a full-wave bridge rectifier. The bridge rectifier circuit can consist of four separate silicon diodes or one bridge component. This bridge rectifier results in a rippled DC current and therefore serves as an example circuit only. A different rectification scheme may be employed, depending on cost considerations. For example, more capacitors or inductors and resistors may be added to further reduce ripple at a minor cost increase. A larger filter capacitor helps filter out the AC from the DC source. Because of the many possibilities and because of their insignificance, these and similar additional circuit features have been purposely omitted from FIG. 1. The actual voltage reducing device 50 used is a varistor. A varistor or similar fusing device may be used to ensure that voltage is limited during power surges. The actual zener diode 40 can also be an avalanche breakdown diode or a voltage regulator tube. Although input power at bi-pins 15 of LED lamp 10 are rectified by AC-to-DC converters 20, it will be noted that the LED lamp 10 will still operate with input power at only one end or across any two pins on bi-pins 15.

When ballast power is connected to one or both ends of LED lamp 10 by way of bi-pins 15, the ballast power is transferred to AC-to-DC converters 20. DC voltage from AC-to-DC converters 20 is filtered by capacitors 25 and bleeder resistors 30. DC voltage from AC-to-DC converters 20 is also connected to one side of high power current limiting resistor 35. The other side of resistor 35 is connected in series to the cathode side of zener diode 40 and to the anode side of the first LED 45A in the series string of LEDs 45. The cathode side of last LED 45B and the anode side of zener diode 40 are connected to the negative sides of AC-to-DC converters 20. The negative sides of AC-to-DC converters 20 are connected together to DC ground. Voltage reducing devices 50 may be connected to the bi-pins 15 of LED lamp 10.

When line voltage AC power is connected to one or both ends of LED lamp 10 by way of bi-pins 15, the line voltage AC power is transferred to AC-to-DC converters 20. DC voltage from AC-to-DC converters 20 is filtered by capacitors 25 and bleeder resistors 30. DC voltage from AC-to-DC converters 20 is also connected to one side of high power current limiting resistor 35. The other side of resistor 35 is connected in series to the cathode side of zener diode 40 and to the anode side of the first LED 45A in the series string of LEDs 45. The cathode side of last LED 45B and the anode side of zener diode 40 are connected to the negative sides of AC-to-DC converters 20. The negative sides of AC-to-DC converters 20 are connected together to DC ground. Voltage reducing devices 50 may be connected to the bi-pins 15 of LED lamp 10.

When DC power is connected to one or both ends of LED lamp 10 by way of bi-pins 15, the DC power is transferred to AC-to-DC converters 20. DC voltage from AC-to-DC converters 20 is filtered by capacitors 25 and bleeder resistors 30. DC voltage from AC-to-DC converters 20 is also connected to one side of high power current limiting resistor 35. The other side of resistor 35 is connected in series to the cathode side of zener diode 40 and to the anode side of the first LED 45A in the series string of LEDs 45. The cathode side of last LED 45B and the anode side of zener diode 40 are connected to the negative sides of AC-to-DC converters 20. The negative sides of AC-to-DC converters 20 are connected together to DC ground. Voltage reducing devices 50 may be connected to the bi-pins 15 of LED lamp 10.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 10, the electromagnetic induction power is transferred to AC-to-DC converters 20. DC voltage from AC-to-DC converters 20 is filtered by capacitors 25 and bleeder resistors 30. DC voltage from AC-to-DC converters 20 is also connected to one side of high power current limiting resistor 35. The other side of resistor 35 is connected in series to the cathode side of zener diode 40 and to the anode side of the first LED 45A in the series string of LEDs 45. The cathode side of last LED 45B and the anode side of zener diode 40 are connected to the negative sides of AC-to-DC converters 20. The negative sides of AC-to-DC converters 20 are connected together to DC ground. In this manner, LED lamp 10 is powered without a direct electrical connection. Voltage reducing devices 50 may be connected to the bi-pins 15 of LED lamp 10.

Exemplary values for the relevant electrical components depicted in FIG. 1 are: AC-to-DC converters 20=1 ampere diodes each rated 600 volts; capacitors 25=10 uF; resistors 30=1 mega ohm; resistor 35=300 ohms; zener diode 40=120 volts; and LEDs 45, 45A-45B each LED having forward voltage drops in the range 3.1-3.6 VDC.

Figure 2:
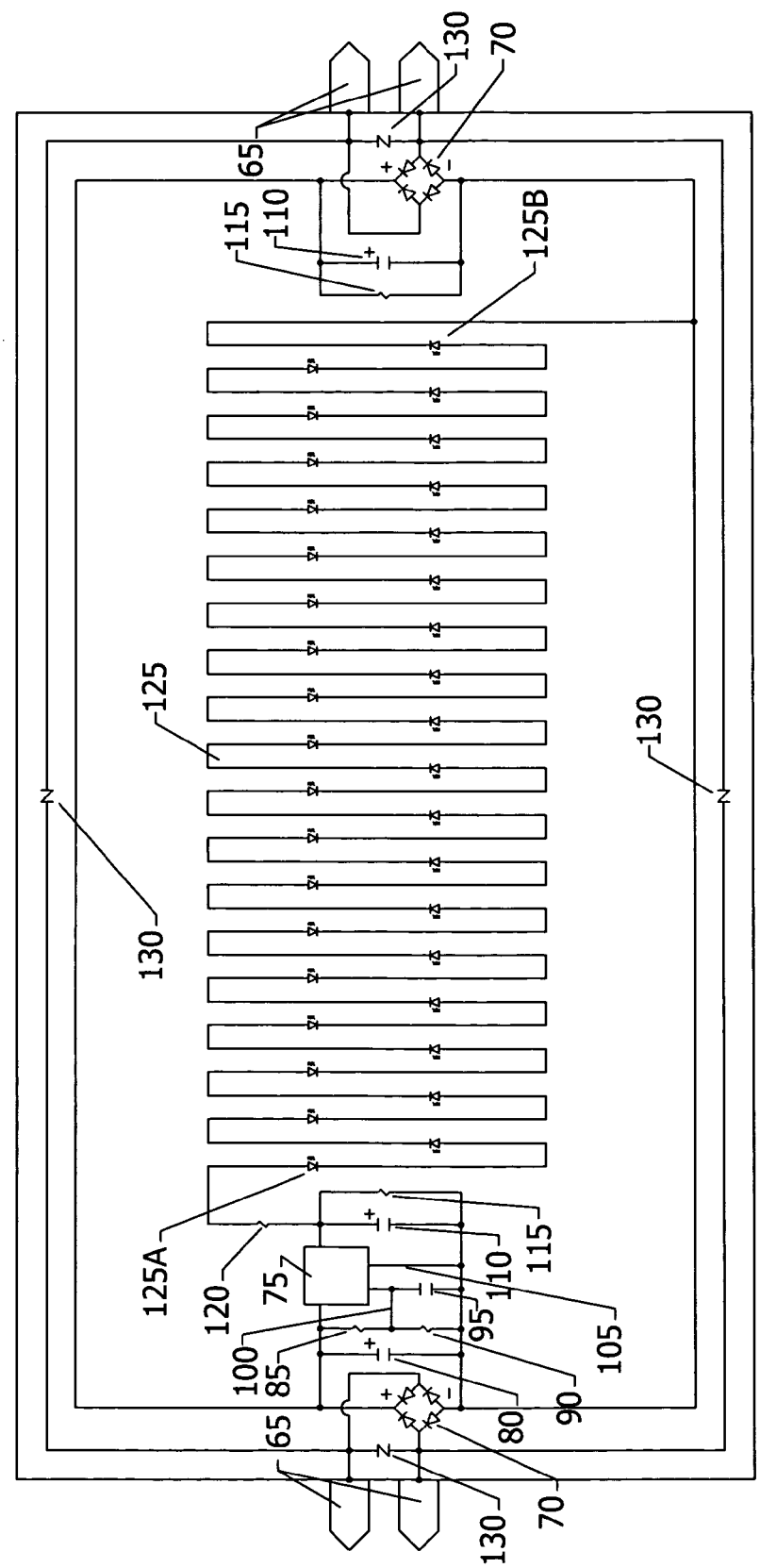
FIG. 2 shows a second embodiment of the present invention using a high voltage regulator IC as the main voltage regulating device in parallel with at least one LED.

FIG. 2 shows a second embodiment of the present invention using a high voltage regulator IC 75 as the main voltage regulating device to provide power to a series string of LEDs 125. LED lamp 60 is shown with bi-pins 65 on opposite ends of LED lamp 60. On both ends, bi-pins 65 are connected to the AC sides of AC-to-DC converters 70. The positive sides of AC-to-DC converters 70 are connected together. The positive sides of AC-to-DC converters 70 are also connected to a smoothing capacitor 80 and then to a resistor bridge consisting of resistor 85 and resistor 90. The positive sides of AC-to-DC converters 70 connect to one side of resistor 85 and to the input voltage side of high voltage regulator IC 75. The other side of resistor 85 is connected to one side of resistor 90 to base pin 100 of high voltage regulator IC 75 and to one side of capacitor 95. The other side of capacitor 95 connects to the negative sides of AC-to-DC converters 70 and to ground pin 105 of high voltage regulator IC 75. The output voltage side of high voltage regulator IC 75 is filtered through capacitor 110 and bleeder resistor 115, and then passes through optional current limiting resistor 120 connected to series string of LEDs 125. Voltage reducing devices 130 may be connected to the bi-pins 65 of LED lamp 60.

The actual AC-to-DC converter 70 used is a full-wave bridge rectifier. The bridge rectifier circuit can consist of four separate silicon diodes or one bridge component. This bridge rectifier results in a rippled DC current and therefore serves as an example circuit only. A different rectification scheme may be employed, depending on cost considerations. For example, more capacitors or inductors and resistors may be added to further reduce ripple at a minor cost increase. A larger filter capacitor helps filter out the AC from the DC source. Because of the many possibilities and because of their insignificance, these and similar additional circuit features have been purposely omitted from FIG. 2. The actual voltage reducing device 130 used is a varistor. A varistor or similar fusing device may be used to ensure that voltage is limited during power surges. The actual high voltage regulator IC 75 used is a TV hybrid voltage regulator IC, DC-DC converter, buck converter, or similar high voltage DC voltage regulating device. Although input power at bi-pins 65 of LED lamp 60 are rectified by AC-to-DC converters 70, it will be noted that the LED lamp 60 will still operate with input power at only one end or across any two pins on bi-pins 65.

When ballast power is connected to one or both ends of LED lamp 60 by way of bi-pins 65, the ballast power is transferred to AC-to-DC converters 70. DC voltage from AC-to-DC converters 70 is then connected to a smoothing capacitor 80 and then to a resistor bridge consisting of resistor 85 and resistor 90. The positive sides of AC-to-DC converters 70 connect to one side of resistor 85 and to the input voltage side of high voltage regulator IC 75. The other side of resistor 85 is connected to one side of resistor 90 to base pin 100 of high voltage regulator IC 75 and to one side of capacitor 95. The other side of capacitor 95 and the other side of resistor 90 connect to the negative sides of AC-to-DC converters 70 and to ground pin 105 of high voltage regulator IC 75. The output voltage side of high voltage regulator IC 75 is filtered through capacitor 110 and bleeder resistor 115 to DC ground. DC voltage from the output voltage side of high voltage regulator IC 75 is also connected to one side of optional current limiting resistor 120. The other side of optional current limiting resistor 120 is connected in series to the anode side of the first LED 125A in the series string of LEDs 125. The cathode side of last LED 125B is connected to the negative sides of AC-to-DC converters 70 to DC ground. Voltage reducing devices 130 may be connected to the bi-pins 65 of LED lamp 60.

When line voltage AC power is connected to one or both ends of LED lamp 60 by way of bi-pins 65, the line voltage AC power is transferred to AC-to-DC converters 70. DC voltage from AC-to-DC converters 70 is then connected to a smoothing capacitor 80 and then to a resistor bridge consisting of resistor 85 and resistor 90. The positive sides of AC-to-DC converters 70 connect to one side of resistor 85 and to the input voltage side of high voltage regulator IC 75. The other side of resistor 85 is connected to one side of resistor 90 to base pin 100 of high voltage regulator IC 75 and to one side of capacitor 95. The other side of capacitor 95 and the other side of resistor 90 connect to the negative sides of AC-to-DC converters 70 and to ground pin 105 of high voltage regulator IC 75. The output voltage side of high voltage regulator IC 75 is filtered through capacitor 110 and bleeder resistor 115 to DC ground. DC voltage from the output voltage side of high voltage regulator IC 75 is also connected to one side of optional current limiting resistor 120. The other side of optional current limiting resistor 120 is connected in series to the anode side of the first LED 125A in the series string of LEDs 125. The cathode side of last LED 125B is connected to the negative sides of AC-to-DC converters 70 to DC ground. Voltage reducing devices 130 may be connected to the bi-pins 65 of LED lamp 60.

When DC power is connected to one or both ends of LED lamp 60 by way of bi-pins 65, the DC power is transferred to AC-to-DC converters 70. DC voltage from AC-to-DC converters 70 is then connected to a smoothing capacitor 80 and then to a resistor bridge consisting of resistor 85 and resistor 90. The positive sides of AC-to-DC converters 70 connect to one side of resistor 85 and to the input voltage side of high voltage regulator IC 75. The other side of resistor 85 is connected to one side of resistor 90 to base pin 100 of high voltage regulator IC 75 and to one side of capacitor 95. The other side of capacitor 95 and the other side of resistor 90 connect to the negative sides of AC-to-DC converters 70 and to ground pin 105 of high voltage regulator IC 75. The output voltage side of high voltage regulator IC 75 is filtered through capacitor 110 and bleeder resistor 115 to DC ground. DC voltage from the output voltage side of high voltage regulator IC 75 is also connected to one side of optional current limiting resistor 120. The other side of optional current limiting resistor 120 is connected in series to the anode side of the first LED 125A in the series string of LEDs 125. The cathode side of last LED 125B is connected to the negative sides of AC-to-DC converters 70 to DC ground. Voltage reducing devices 130 may be connected to the bi-pins 65 of LED lamp 60.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 10, the electromagnetic induction power is transferred to AC-to-DC converters 70. DC voltage from AC-to-DC converters 70 is then connected to a smoothing capacitor 80 and then to a resistor bridge consisting of resistor 85 and resistor 90. The positive sides of AC-to-DC converters 70 connect to one side of resistor 85 and to the input voltage side of high voltage regulator IC 75. The other side of resistor 85 is connected to one side of resistor 90 to base pin 100 of high voltage regulator IC 75 and to one side of capacitor 95. The other side of capacitor 95 and the other side of resistor 90 connect to the negative sides of AC-to-DC converters 70 and to ground pin 105 of high voltage regulator IC 75. The output voltage side of high voltage regulator IC 75 is then filtered through capacitor 110 and bleeder resistor 115 to DC ground. DC voltage from the output voltage side of high voltage regulator IC 75 is also connected to one side of optional current limiting resistor 120. The other side of optional current limiting resistor 120 is connected in series to the anode side of the first LED 125A in the series string of LEDs 125. The cathode side of last LED 125B is connected to the negative sides of AC-to-DC converters 70 to DC ground. Voltage reducing devices 130 may be connected to the bi-pins 65 of LED lamp 60.

Exemplary values for the relevant electrical components depicted in FIG. 2 are: AC-to-DC converters 70=1 ampere diodes each rated 600 volts; capacitors 110=10 uF; resistors 115=1 mega ohm; LEDs 125, 125A-125B each LED having forward voltage drops in the range 3.1-3.6 VDC; high voltage regulator IC 75 is an NTE1796 or equivalent IC with a fixed output at 114.5 volts; capacitor 80=220 uF; resistor 85=10 kilo ohms; resistor 90=180 kilo ohms; and capacitor 95=100 uF.

Figure 3:
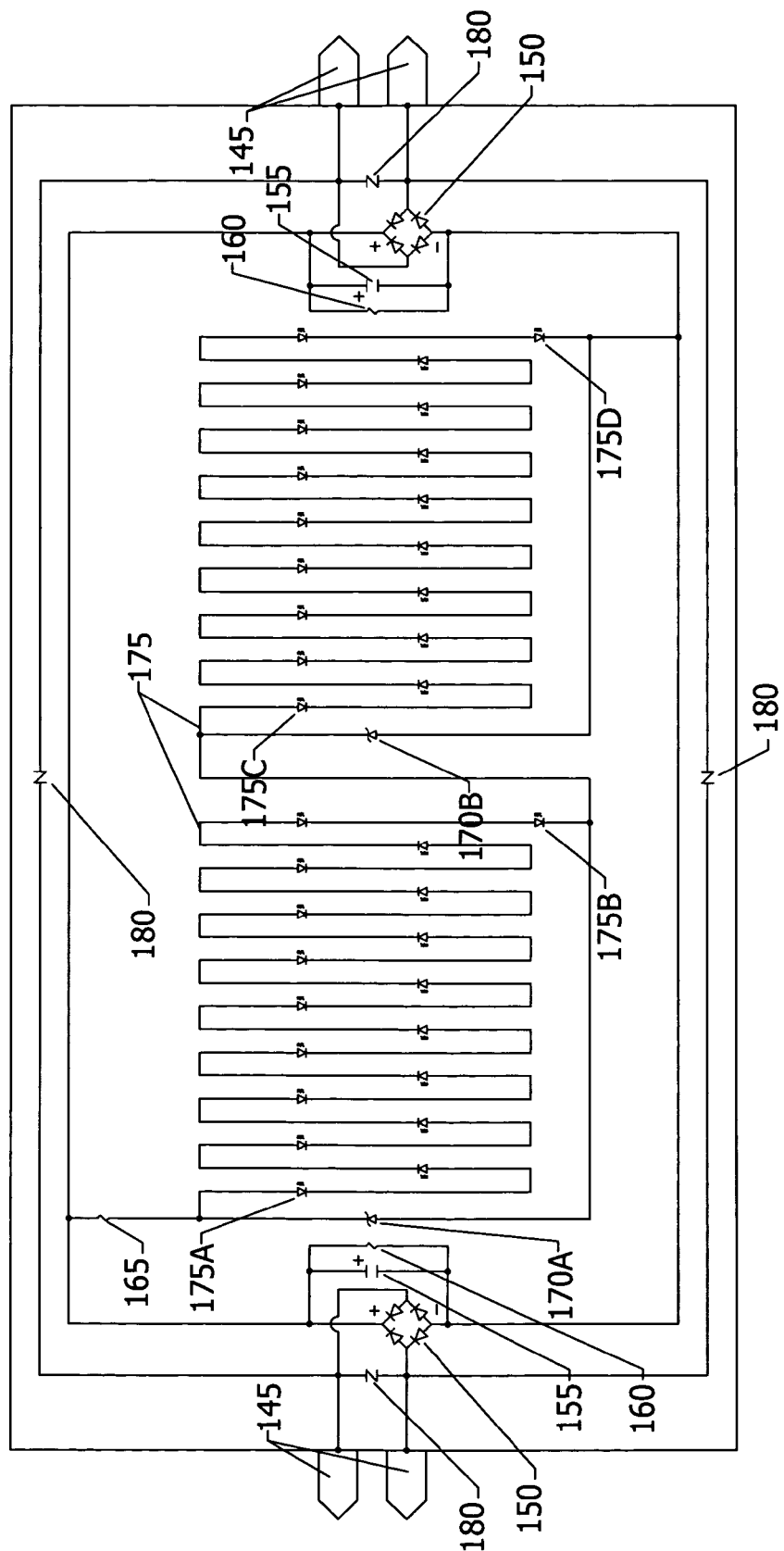
FIG. 3 shows an alternate embodiment of the present invention shown in FIG. 1 using more than one zener diode each in parallel with at least one LED.

FIG. 3 shows an alternate embodiment of the present invention shown in FIG. 1 using a high power current limiting resistor 165 and a zener diode 170A and zener diode 170B as the main voltage regulating device to provide power to a series string of LEDs 175. Now, two separate circuits are shown with same resistor 165 and a zener diode 170A in series with zener diode 170B each in parallel with and powering a separate series string of LEDs 175. A separate resistor (not shown) may be used for the second circuit. The two separate circuits allow at least one series string of LEDs 175 to remain lit in the event one of the two circuits should fail. LED lamp 140 is shown with bi-pins 145 on opposite ends of LED lamp 140. On both ends, bi-pins 145 are connected to the AC sides of AC-to-DC converters 150. The positive sides of AC-to-DC converters 150 are connected together. The positive sides are also filtered through capacitors 155 and bleeder resistors 160, and then passes through resistor 165 connected in series with zener diode 170A and parallel with a string of LEDs 175, and then in series with zener diode 170B and parallel with a string of LEDs 175. Voltage reducing devices 180 may be connected to the bi-pins 145 of LED lamp 140.

The actual AC-to-DC converter 150 used is a full-wave bridge rectifier. The bridge rectifier circuit can consist of four separate silicon diodes or one bridge component. This bridge rectifier results in a rippled DC current and therefore serves as an example circuit only. A different rectification scheme may be employed, depending on cost considerations. For example, more capacitors or inductors and resistors may be added to further reduce ripple at a minor cost increase. A larger filter capacitor helps filter out the AC from the DC source. Because of the many possibilities and because of their insignificance, these and similar additional circuit features have been purposely omitted from FIG. 3. The actual voltage reducing device 180 used is a varistor. A varistor or similar fusing device may be used to ensure that voltage is limited during power surges. The actual zener diodes 170A and 170B can also be an avalanche breakdown diode or a voltage regulator tube. Although input power at bi-pins 145 of LED lamp 140 are rectified by AC-to-DC converters 150, it will be noted that the LED lamp 140 will still operate with input power at only one end or across any two pins on bi-pins 145.

When ballast power is connected to one or both ends of LED lamp 140 by way of bi-pins 145, the ballast power is transferred to AC-to-DC converters 150. DC voltage from AC-to-DC converters 150 is filtered by capacitors 155 and bleeder resistors 160. DC voltage from AC-to-DC converters 150 is also connected to one side of high power current limiting resistor 165. The other side of resistor 165 is connected in series to the cathode side of zener diode 170A and to the anode side of the first LED 175A in the first series string of LEDs 175. The cathode side of last LED 175B and the anode side of zener diode 170A are connected in series to the cathode side of zener diode 170B and to the anode side of the first LED 175C in the second series string of LEDs 175. The cathode side of last LED 175D and the anode side of zener diode 170B are connected to the negative sides of AC-to-DC converters 150. The negative sides of AC-to-DC converters 150 are connected together to DC ground. Voltage reducing devices 180 may be connected to the bi-pins 145 of LED lamp 140.

When line voltage AC power is connected to one or both ends of LED lamp 140 by way of bi-pins 145, the line voltage AC power is transferred to AC-to-DC converters 150. DC voltage from AC-to-DC converters 150 is filtered by capacitors 155 and bleeder resistors 160. DC voltage from AC-to-DC converters 150 is also connected to one side of high power current limiting resistor 165. The other side of resistor 165 is connected in series to the cathode side of zener diode 170A and to the anode side of the first LED 175A in the first series string of LEDs 175. The cathode side of last LED 175B and the anode side of zener diode 170A are connected in series to the cathode side of zener diode 170B and to the anode side of the first LED 175C in the second series string of LEDs 175. The cathode side of last LED 175D and the anode side of zener diode 170B are connected to the negative sides of AC-to-DC converters 150. The negative sides of AC-to-DC converters 150 are connected together to DC ground. Voltage reducing devices 180 may be connected to the bi-pins 145 of LED lamp 140.

When DC power is connected to one or both ends of LED lamp 140 by way of bi-pins 145, the DC power is transferred to AC-to-DC converters 150. DC voltage from AC-to-DC converters 150 is filtered by capacitors 155 and bleeder resistors 160. DC voltage from AC-to-DC converters 150 is also connected to one side of high power current limiting resistor 165. The other side of resistor 165 is connected in series to the cathode side of zener diode 170A and to the anode side of the first LED 175A in the first series string of LEDs 175. The cathode side of last LED 175B and the anode side of zener diode 170A are connected in series to the cathode side of zener diode 170B and to the anode side of the first LED 175C in the second series string of LEDs 175. The cathode side of last LED 175D and the anode side of zener diode 170B are connected to the negative sides of AC-to-DC converters 150. The negative sides of AC-to-DC converters 150 are connected together to DC ground. Voltage reducing devices 180 may be connected to the bi-pins 145 of LED lamp 140.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 140, the electromagnetic induction power is transferred to AC-to-DC converters 150. DC voltage from AC-to-DC converters 150 is filtered by capacitors 155 and bleeder resistors 160. DC voltage from AC-to-DC converters 150 is also connected to one side of high power current limiting resistor 165. The other side of resistor 165 is connected in series to the cathode side of zener diode 170A and to the anode side of the first LED 175A in the first series string of LEDs 175. The cathode side of last LED 175B and the anode side of zener diode 170A are connected in series to the cathode side of zener diode 170B and to the anode side of the first LED 175C in the second series string of LEDs 175. The cathode side of last LED 175D and the anode side of zener diode 170B are connected to the negative sides of AC-to-DC converters 150. The negative sides of AC-to-DC converters 150 are connected together to DC ground. In this manner, LED lamp 140 is powered without a direct electrical connection. Voltage reducing devices 180 may be connected to the bi-pins 145 of LED lamp 140.

Exemplary values for the relevant electrical components depicted in FIG. 3 are: AC-to-DC converters 150=1 ampere diodes rated 600 volts; capacitors 155=10 uF; resistors 160=1 mega ohm; resistor 165=300 ohms; zener diodes 170A, 170B=60 volts; and LEDs 175, 175A, 175B, 175C, and 175D each LED having forward voltage drops in the range 3.1-3.6 VDC.

Figure 4:
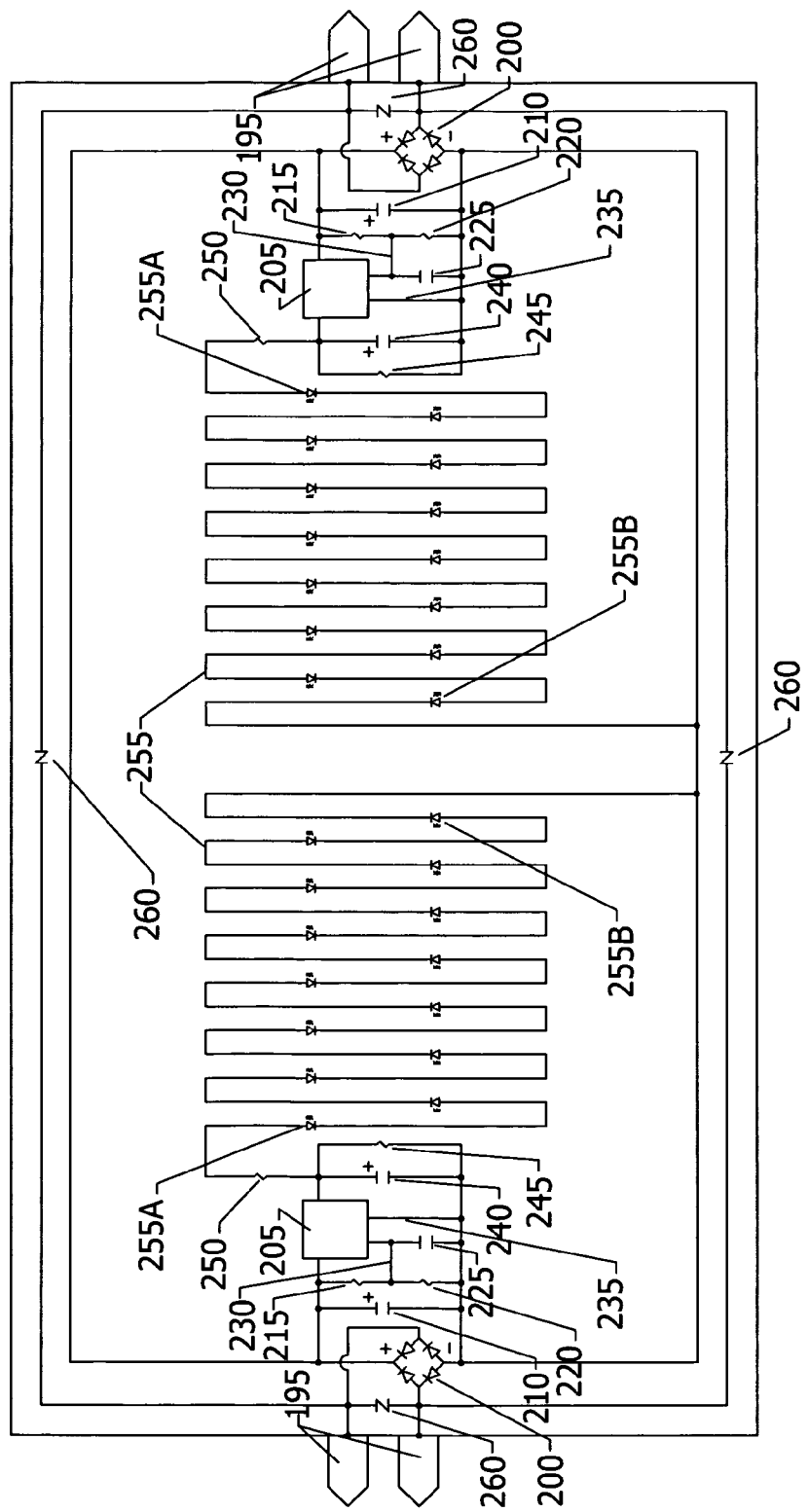
FIG. 4 shows an alternate embodiment of the present invention shown in FIG. 2 using more than one high voltage regulator IC each in parallel with at least one LED.

FIG. 4 shows an alternate embodiment of the present invention shown in FIG. 2 using a high voltage regulator IC 205 as the main voltage regulating device to provide power to a series string of LEDs 255. Now, two separate circuits are shown each with a separate high voltage regulator IC 205 each to power a separate series string of LEDs 255. The two separate circuits allow at least one series string of LEDs 255 to remain lit in the event one of the two circuits should fail.

LED lamp 190 is shown with bi-pins 195 on opposite ends of LED lamp 190. On both ends, bi-pins 195 are connected to the AC sides of AC-to-DC converters 200. The positive sides of AC-to-DC converters 200 are connected together. The positive sides of AC-to-DC converters 200 are also connected to a smoothing capacitor 210 and then to a resistor bridge consisting of resistor 215 and resistor 220. The positive sides of AC-to-DC converters 200 connect to one side of resistor 215 and to the input voltage side of high voltage regulator IC 205. The other side of resistor 215 is connected to one side of resistor 220 to base pin 230 of high voltage regulator IC 205 and to one side of capacitor 225. The other side of capacitor 225 connects to the negative sides of AC-to-DC converters 200 and to ground pin 235 of high voltage regulator IC 205. The output voltage side of high voltage regulator IC 205 is filtered through capacitor 240 and bleeder resistor 245, and then passes through optional current limiting resistor 250 connected to series string of LEDs 255. Voltage reducing devices 260 may be connected to the bi-pins 195 of LED lamp 190.

The actual AC-to-DC converter 200 used is a full-wave bridge rectifier. The bridge rectifier circuit can consist of four separate silicon diodes or one bridge component. This bridge rectifier results in a rippled DC current and therefore serves as an example circuit only. A different rectification scheme may be employed, depending on cost considerations. For example, more capacitors or inductors and resistors may be added to further reduce ripple at a minor cost increase. A larger filter capacitor helps filter out the AC from the DC source. Because of the many possibilities and because of their insignificance, these and similar additional circuit features have been purposely omitted from FIG. 4. The actual voltage reducing device 260 used is a varistor. A varistor or similar fusing device may be used to ensure that voltage is limited during power surges. The actual high voltage regulator IC 205 used is a TV hybrid voltage regulator IC, DC-DC converter, buck converter, or similar high voltage DC voltage regulating device. Although input power at bi-pins 195 of LED lamp 190 are rectified by AC-to-DC converters 200, it will be noted that the LED lamp 190 will still operate with input power at only one end or across any two pins on bi-pins 195.

When ballast power is connected to one or both ends of LED lamp 190 by way of bi-pins 195, the ballast power is transferred to AC-to-DC converters 200. DC voltage from AC-to-DC converters 200 is then connected to a smoothing capacitor 210 and then to a resistor bridge consisting of resistor 215 and resistor 220. The positive sides of AC-to-DC converters 200 connect to one side of resistor 215 and to the input voltage side of high voltage regulator IC 205. The other side of resistor 215 is connected to one side of resistor 220 to base pin 230 of high voltage regulator IC 205 and to one side of capacitor 225. The other side of capacitor 225 and the other side of resistor 220 connect to the negative sides of AC-to-DC converters 200 and to ground pin 235 of high voltage regulator IC 205. The output voltage side of high voltage regulator IC 205 is filtered through capacitor 240 and bleeder resistor 245 to DC ground. DC voltage from the output voltage side of high voltage regulator IC 205 is also connected to one side of optional current limiting resistor 250. The other side of optional current limiting resistor 250 is connected in series to the anode side of the first LED 255A in each series string of LEDs 255. The cathode side of last LED 255B in each series string of LEDs 255 is connected to the negative sides of AC-to-DC converters 200 to DC ground. Voltage reducing devices 260 may be connected to the bi-pins 195 of LED lamp 190.

When line voltage AC power is connected to one or both ends of LED lamp 190 by way of bi-pins 195, the line voltage AC power is transferred to AC-to-DC converters 200. DC voltage from AC-to-DC converters 200 is then connected to a smoothing capacitor 210 and then to a resistor bridge consisting of resistor 215 and resistor 220. The positive sides of AC-to-DC converters 200 connect to one side of resistor 215 and to the input voltage side of high voltage regulator IC 205. The other side of resistor 215 is connected to one side of resistor 220 to base pin 230 of high voltage regulator IC 205 and to one side of capacitor 225. The other side of capacitor 225 and the other side of resistor 220 connect to the negative sides of AC-to-DC converters 200 and to ground pin 235 of high voltage regulator IC 205. The output voltage side of high voltage regulator IC 205 is filtered through capacitor 240 and bleeder resistor 245 to DC ground. DC voltage from the output voltage side of high voltage regulator IC 205 is also connected to one side of optional current limiting resistor 250. The other side of optional current limiting resistor 250 is connected in series to the anode side of the first LED 255A in each series string of LEDs 255. The cathode side of last LED 255B in each series string of LEDs 255 is connected to the negative sides of AC-to-DC converters 200 to DC ground. Voltage reducing devices 260 may be connected to the bi-pins 195 of LED lamp 190.

When DC power is connected to one or both ends of LED lamp 190 by way of bi-pins 195, the DC power is transferred to AC-to-DC converters 200. DC voltage from AC-to-DC converters 200 is then connected to a smoothing capacitor 210 and then to a resistor bridge consisting of resistor 215 and resistor 220. The positive sides of AC-to-DC converters 200 connect to one side of resistor 215 and to the input voltage side of high voltage regulator IC 205. The other side of resistor 215 is connected to one side of resistor 220 to base pin 230 of high voltage regulator IC 205 and to one side of capacitor 225. The other side of capacitor 225 and the other side of resistor 220 connect to the negative sides of AC-to-DC converters 200 and to ground pin 235 of high voltage regulator IC 205. The output voltage side of high voltage regulator IC 205 is filtered through capacitor 240 and bleeder resistor 245 to DC ground. DC voltage from the output voltage side of high voltage regulator IC 205 is also connected to one side of optional current limiting resistor 250. The other side of optional current limiting resistor 250 is connected in series to the anode side of the first LED 255A in each series string of LEDs 255. The cathode side of last LED 255B in each series string of LEDs 255 is connected to the negative sides of AC-to-DC converters 200 to DC ground. Voltage reducing devices 260 may be connected to the bi-pins 195 of LED lamp 190.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 190, the electromagnetic induction power is transferred to AC-to-DC converters 200. DC voltage from AC-to-DC converters 200 is then connected to a smoothing capacitor 210 and then to a resistor bridge consisting of resistor 215 and resistor 220. The positive sides of AC-to-DC converters 200 connect to one side of resistor 215 and to the input voltage side of high voltage regulator IC 205. The other side of resistor 215 is connected to one side of resistor 220 to base pin 230 of high voltage regulator IC 205 and to one side of capacitor 225. The other side of capacitor 225 and the other side of resistor 220 connect to the negative sides of AC-to-DC converters 200 and to ground pin 235 of high voltage regulator IC 205. The output voltage side of high voltage regulator IC 205 is then filtered through capacitor 240 and bleeder resistor 245 to DC ground. DC voltage from the output voltage side of high voltage regulator IC 205 is also connected to one side of optional current limiting resistor 250. The other side of optional current limiting resistor 250 is connected in series to the anode side of the first LED 255A in each series string of LEDs 255. The cathode side of last LED 255B in each series string of LEDs 255 is connected to the negative sides of AC-to-DC converters 200 to DC ground. Voltage reducing devices 260 may be connected to the bi-pins 195 of LED lamp 190.

Exemplary values for the relevant electrical components depicted in FIG. 4 are: AC-to-DC converters 200=1 ampere diodes each rated 600 volts; capacitors 240=10 uF; resistors 245=1 mega ohm; LEDs 255, 255A-255B each LED having forward voltage drops in the range 3.1-3.6 VDC; high voltage regulator IC 205 is an voltage regulator IC NTE 1841 with a fixed output at 43.8 volts; capacitors 210=220 uF; resistors 215~10 kilo ohms; resistors 220~180 kilo ohms; and capacitors 225=100 uF.

Figure 5:
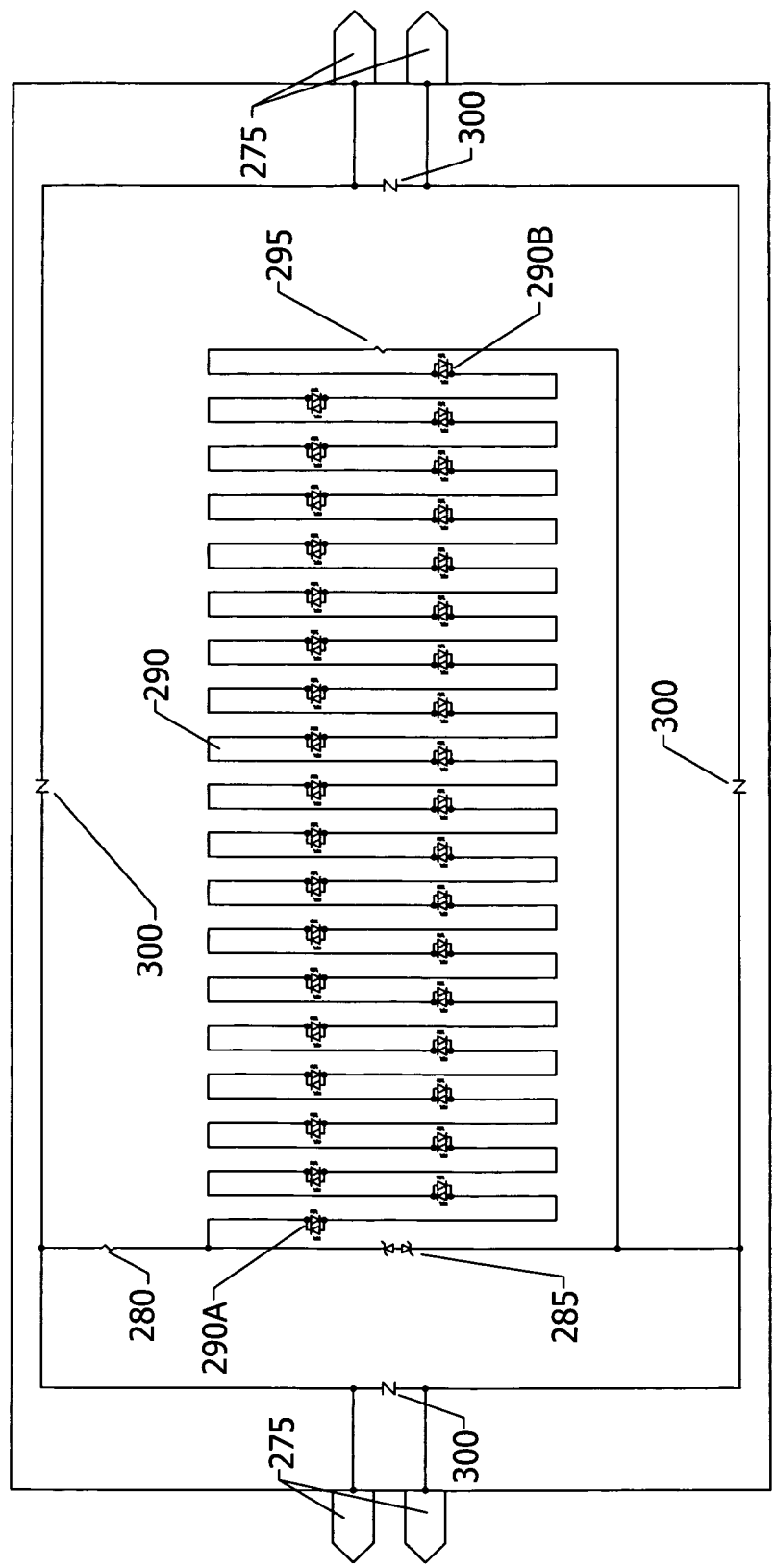
FIG. 5 shows a third embodiment of the present invention using a single resistor and back-to-back zener diodes as the main voltage regulating device in parallel with at least one pair of diodes connected in anti-parallel in series with a resistor.

FIG. 5 shows a third embodiment of the present invention using a high power current limiting resistor 280 and back-to-back zener diodes 285 as the main voltage regulating device to provide power to a series string of anti-parallel diode pairs 290. LED lamp 270 is shown with bi-pins 275 on opposite ends of LED lamp 270. Voltage reducing devices 300 may be connected to the bi-pins 275 of LED lamp 270.

The actual voltage reducing device 300 used is a varistor. A varistor or similar fusing device may be used to ensure that voltage is limited during power surges. The actual back-to-back zener diodes 285 can also be a back-to-back avalanche breakdown diodes or back-to-back TVS. Each anti-parallel diode pair 290 can consist of one diode and one LED, or both diodes can be LEDs. LED lamp 270 shows two LEDs in each anti-parallel diode pair 290. It will be noted that the LED lamp 270 will still operate with input power at only one end or across any two pins on bi-pins 275.

When ballast power is connected to one or both ends of LED lamp 270 by way of bi-pins 275, the ballast power is connected to one side of high power current limiting resistor 280. The other side of resistor 280 is connected in series to the cathode side of one side of the back-to-back zener diodes 285 and to the first anti-parallel LED pair 290A in the series string of anti-parallel LED pairs 290. The last anti-parallel LED pair 290B is then connected to one side of resistor 295. The other side of resistor 295 and the cathode side of the other side of back-to-back zener diodes 285 are connected back to bi-pins 275. Voltage reducing devices 300 may be connected to the bi-pins 275 of LED lamp 270.

When line voltage AC power is connected to one or both ends of LED lamp 270 by way of bi-pins 275, the line voltage AC power is connected to one side of high power current limiting resistor 280. The other side of resistor 280 is connected in series to the cathode side of one side of the back-to-back zener diodes 285 and to the first anti-parallel LED pair 290A in the series string of anti-parallel LED pairs 290. The last anti-parallel LED pair 290B is then connected to one side of resistor 295. The other side of resistor 295 and the cathode side of the other side of back-to-back zener diodes 285 are connected back to bi-pins 275. Voltage reducing devices 300 may be connected to the bi-pins 275 of LED lamp 270.

When DC power is connected to one or both ends of LED lamp 270 by way of bi-pins 275, the DC power is connected to one side of high power current limiting resistor 280. The other side of resistor 280 is connected in series to the cathode side of one side of the back-to-back zener diodes 285 and to the first anti-parallel LED pair 290A in the series string of anti-parallel LED pairs 290. The last anti-parallel LED pair 290B is then connected to one side of resistor 295. The other side of resistor 295 and the cathode side of the other side of back-to-back zener diodes 285 are connected back to bi-pins 275. Voltage reducing devices 300 may be connected to the bi-pins 275 of LED lamp 270.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 270, the electromagnetic induction power is connected to one side of high power current limiting resistor 280. The other side of resistor 280 is connected in series to the cathode side of one side of the back-to-back zener diodes 285 and to the first anti-parallel LED pair 290A in the series string of anti-parallel LED pairs 290. The last anti-parallel LED pair 290B is then connected to one side of resistor 295. The other side of resistor 295 and the cathode side of the other side of back-to-back zener diodes 285 are connected back to bi-pins 275. Voltage reducing devices 300 may be connected to the bi-pins 275 of LED lamp 270.

Exemplary values for the relevant electrical components depicted in FIG. 5 are: resistor 280=300 ohms; each zener diodes=120 volts; anti-parallel LED pairs 290, 290A-290B each LED having forward voltage drops in the range 3.1-3.6 VDC; and resistor 295=800 ohms.

Figure 6:
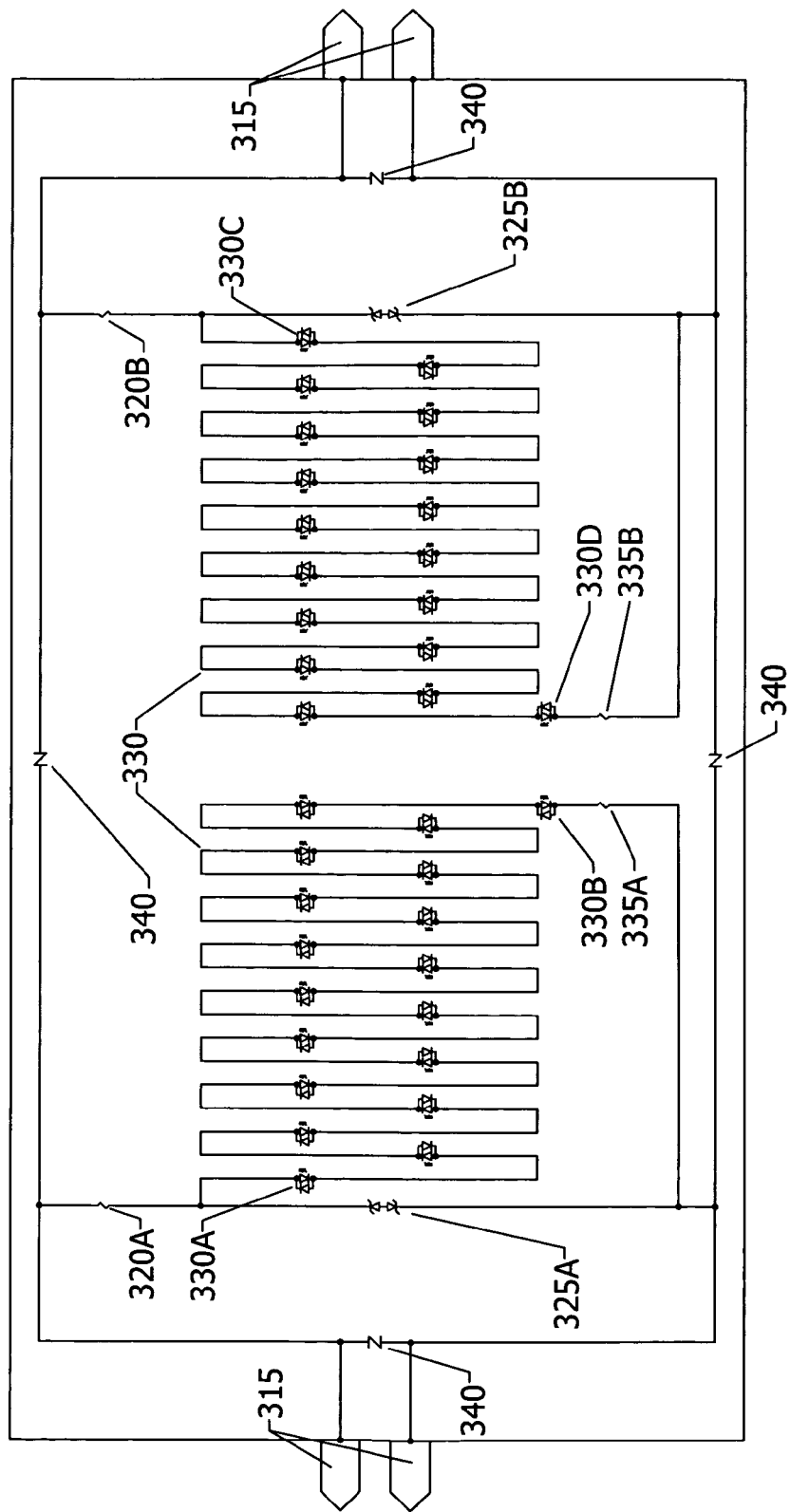
FIG. 6 shows an alternate embodiment of the present invention shown in FIG. 5 using more than one pair of back-to-back zener diodes each in parallel with at least one pair of diodes connected in anti-parallel each in series with a resistor.

FIG. 6 shows an alternate embodiment of the present invention shown in FIG. 5 using high power current limiting resistors 320A, 320B and back-to-back zener diodes 325A, 325B as the main voltage regulating devices to provide power to a series string of anti-parallel diode pairs 330. Each anti-parallel diode pair 330 can consist of one diode and one LED, or both diodes can be LEDs. LED lamp 310 shows one diode and one LED in each anti-parallel diode pair 330. Now, two separate circuits are shown. The first circuit has high power current limiting resistor 320A in series with back-to-back zener diodes 325A to power a series string of anti-parallel diode pairs 330A-330B in series with current limiting resistor 335A. The second circuit has high power current limiting resistor 320B in series with back-to-back zener diodes 325B to power a series string of anti-parallel diode pairs 330C-330D in series with current limiting resistor 335B. The two separate circuits allow at least one series string of anti-parallel diode pairs 330 to remain lit in the event one of the two circuits should fail. LED lamp 310 is shown with bi-pins 315 on opposite ends of LED lamp 310. Voltage reducing devices 340 may be connected to the bi-pins 315 of LED lamp 310.

When ballast power is connected to one or both ends of LED lamp 310 by way of bi-pins 315, the ballast power is connected to one side of high power current limiting resistor 320A and 320B. The other side of resistors 320A and 320B respectively is connected in series to the cathode side of one side of the back-to-back zener diodes 325A and 325B respectively, and to the first anti-parallel LED pair 330A and 330C respectively in the series string of anti-parallel LED pairs 330. The last anti-parallel LED pair 330B and 330D is then connected to one side of resistors 335A and 335B respectively. The other side of resistors 335A and 335B, and the cathode side of the other side of back-to-back zener diodes 325A and 325B respectively are connected back to bi-pins 315 respectively. Voltage reducing devices 340 may be connected to the bi-pins 315 of LED lamp 310.

When line voltage AC power is connected to one or both ends of LED lamp 310 by way of bi-pins 315, the line voltage AC power is connected to one side of high power current limiting resistor 320A and 320B. The other side of resistors 320A and 320B respectively is connected in series to the cathode side of one side of the back-to-back zener diodes 325A and 325B respectively, and to the first anti-parallel LED pair 330A and 330C respectively in the series string of anti-parallel LED pairs 330. The last anti-parallel LED pair 330B and 330D is then connected to one side of resistors 335A and 335B respectively. The other side of resistors 335A and 335B, and the cathode side of the other side of back-to-back zener diodes 325A and 325B respectively are connected back to bi-pins 315 respectively. Voltage reducing devices 340 may be connected to the bi-pins 315 of LED lamp 310.

When DC power is connected to one or both ends of LED lamp 310 by way of bi-pins 315, the DC power is connected to one side of high power current limiting resistor 320A and 320B. The other side of resistors 320A and 320B respectively is connected in series to the cathode side of one side of the back-to-back zener diodes 325A and 325B respectively, and to the first anti-parallel LED pair 330A and 330C respectively in the series string of anti-parallel LED pairs 330. The last anti-parallel LED pair 330B and 330D is then connected to one side of resistors 335A and 335B respectively. The other side of resistors 335A and 335B, and the cathode side of the other side of back-to-back zener diodes 325A and 325B respectively are connected back to bi-pins 315 respectively. Voltage reducing devices 340 may be connected to the bi-pins 315 of LED lamp 310.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 310, the electromagnetic induction power is connected to one side of high power current limiting resistors 320A and 320B. The other side of resistor 320A and 320B respectively is connected in series to the cathode side of one side of the back-to-back zener diodes 325A and 325B respectively, and to the first anti-parallel LED pair 330A and 330C respectively in the series string of anti-parallel LED pairs 330. The last anti-parallel LED pair 330B and 330D is then connected to one side of resistors 335A and 335B respectively. The other side of resistors 335A and 335B, and the cathode side of the other side of back-to-back zener diodes 325A and 325B respectively are connected back to bi-pins 315 respectively. Voltage reducing devices 340 may be connected to the bi-pins 315 of LED lamp 310.

Exemplary values for the relevant electrical components depicted in FIG. 6 are: resistors 320A, 320B=680 ohms; each zener diodes=60 volts; anti-parallel LED pairs 330, 330A-330D each LED having forward voltage drops in the range 3.1-3.6 VDC; and resistors 335A, 335B=400 ohms.

Figure 7:
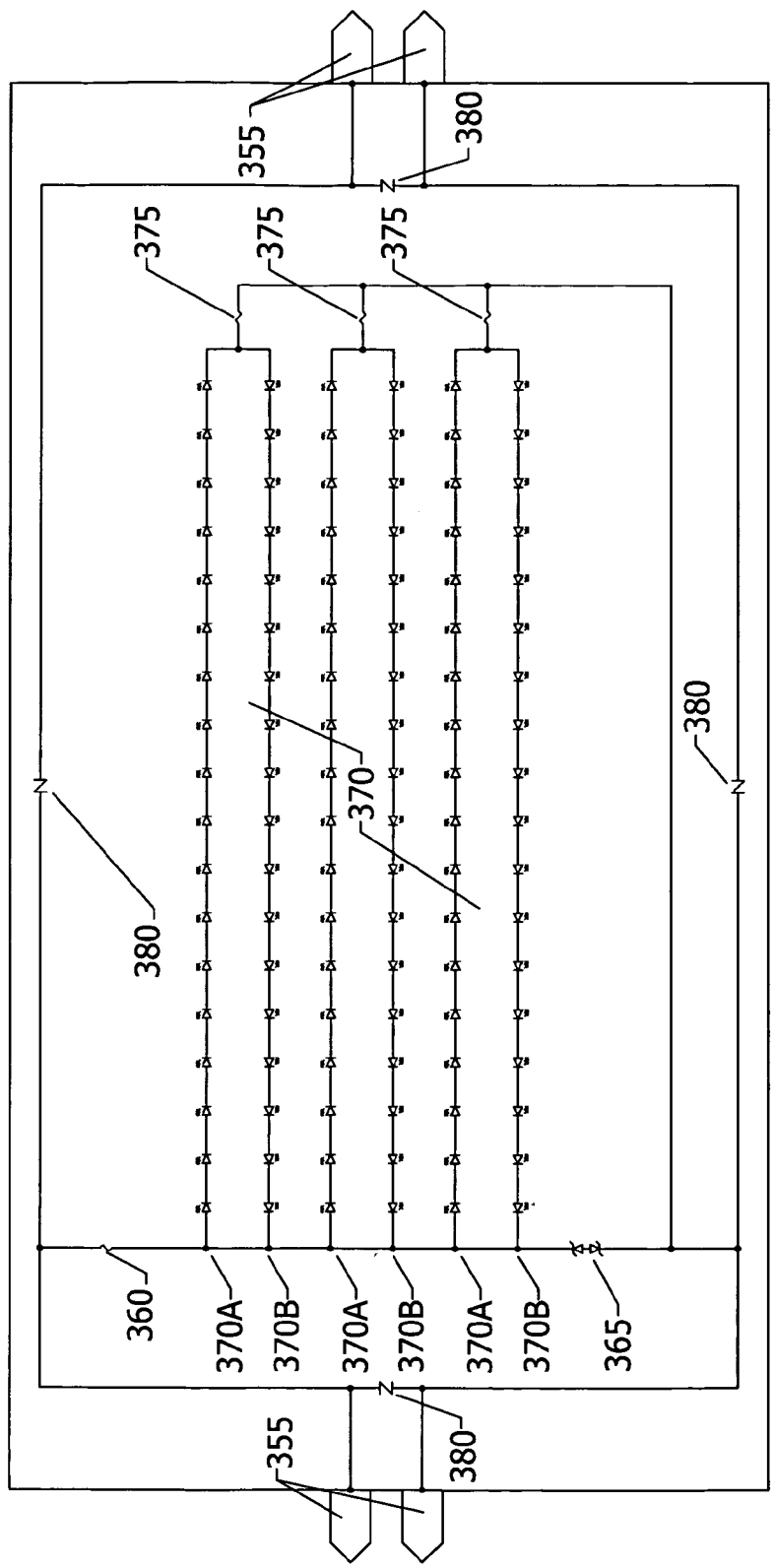
FIG. 7 shows another alternate embodiment of the present invention shown in FIG. 5 using a single resistor and back-to-back zener diodes in parallel with at least one serial string of diode pairs connected in anti-parallel such that any one of the two serial string of diodes can conduct in opposite electrical directions.

FIG. 7 shows an alternate embodiment of the present invention shown in FIG. 5 using high power current limiting resistor 360 and back-to-back zener diodes 365 as the main voltage regulating device to provide power to anti-parallel diode string pairs 370. Each diode string 370A and 370B can consist of diodes and LEDs, or the diodes can all be LEDs. LED lamp 350 shows all LEDs in anti-parallel diode string pairs 370. Now, three separate diode string pairs 370 are shown. Three diode strings 370A operate when power flows away from high power current limiting resistor 360 in series with back-to-back zener diodes 365, and three diode strings 370B operate when power flows towards high power current limiting resistor 360 in series with back-to-back zener diodes 365. An anti-parallel diode string pair 370 consists of one diode string 370A and one diode string 370B allowing for the three anti-parallel diode string pairs 370. Each anti-parallel diode string pair 370 in turn is connected to an optional current limiting resistor 375. The three separate anti-parallel diode string pairs 370, consisting of three diode strings 370A and three diode strings 370B allow at least one series string of anti-parallel diode pairs 370 to remain lit in the event any one of the six diode strings 370A or 370B should fail. LED lamp 350 is shown with bi-pins 355 on opposite ends of LED lamp 350. Voltage reducing devices 380 may be connected to the bi-pins 355 of LED lamp 350.

When ballast power is connected to one or both ends of LED lamp 350 by way of bi-pins 355, the ballast power is connected to one side of high power current limiting resistor 360. The other side of resistor 360 is connected in series to the cathode side of one side of the back-to-back zener diodes 365, and to the anodes of the first LEDs in diode strings 370A and the cathodes of the first LEDs in diode strings 370B that form anti-parallel LED string pairs 370. The cathodes of the last LEDs in diode strings 370A and the anodes of the last LEDs in diode strings 370B of anti-parallel LED string pairs 370 are each tied together and connected to one side of resistors 375. The other side of resistor 375 and the cathode side of the other side of back-to-back zener diodes 365 are connected back to bi-pins 355. Voltage reducing devices 380 may be connected to the bi-pins 355 of LED lamp 350.

When line voltage AC power is connected to one or both ends of LED lamp 350 by way of bi-pins 355, the line voltage AC power is connected to one side of high power current limiting resistor 360. The other side of resistor 360 is connected in series to the cathode side of one side of the back-to-back zener diodes 365, and to the anodes of the first LEDs in diode strings 370A and the cathodes of the first LEDs in diode strings 370B that form anti-parallel LED string pairs 370. The cathodes of the last LEDs in diode strings 370A and the anodes of the last LEDs in diode strings 370B of anti-parallel LED string pairs 370 are each tied together and connected to one side of resistors 375. The other side of resistor 375 and the cathode side of the other side of back-to-back zener diodes 365 are connected back to bi-pins 355. Voltage reducing devices 380 may be connected to the bi-pins 355 of LED lamp 350.

When DC power is connected to one or both ends of LED lamp 350 by way of bi-pins 355, the DC power is connected to one side of high power current limiting resistor 360. The other side of resistor 360 is connected in series to the cathode side of one side of the back-to-back zener diodes 365, and to the anodes of the first LEDs in diode strings 370A and the cathodes of the first LEDs in diode strings 370B that form anti-parallel LED string pairs 370. The cathodes of the last LEDs in diode strings 370A and the anodes of the last LEDs in diode strings 370B of anti-parallel LED string pairs 370 are each tied together and connected to one side of resistors 375. The other side of resistor 375 and the cathode side of the other side of back-to-back zener diodes 365 are connected back to bi-pins 355. Voltage reducing devices 380 may be connected to the bi-pins 355 of LED lamp 350.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 350, the electromagnetic induction power is connected to one side of high power current limiting resistor 360. The other side of resistor 360 is connected in series to the cathode side of one side of the back-to-back zener diodes 365, and to the anodes of the first LEDs in diode strings 370A and the cathodes of the first LEDs in diode strings 370B that form anti-parallel LED string pairs 370. The cathodes of the last LEDs in diode strings 370A and the anodes of the last LEDs in diode strings 370B of anti-parallel LED string pairs 370 are each tied together and connected to one side of resistors 375. The other side of resistor 375 and the cathode side of the other side of back-to-back zener diodes 365 are connected back to bi-pins 355. Voltage reducing devices 380 may be connected to the bi-pins 355 of LED lamp 350.

Exemplary values for the relevant electrical components depicted in FIG. 7 are: resistor 360=237 ohms; each zener diodes=60 volts; anti-parallel LED string pairs 370, 370A-370B each LED having forward voltage drops in the range 3.1-3.6 VDC; and resistor 375=400 ohms.

Figure 8:
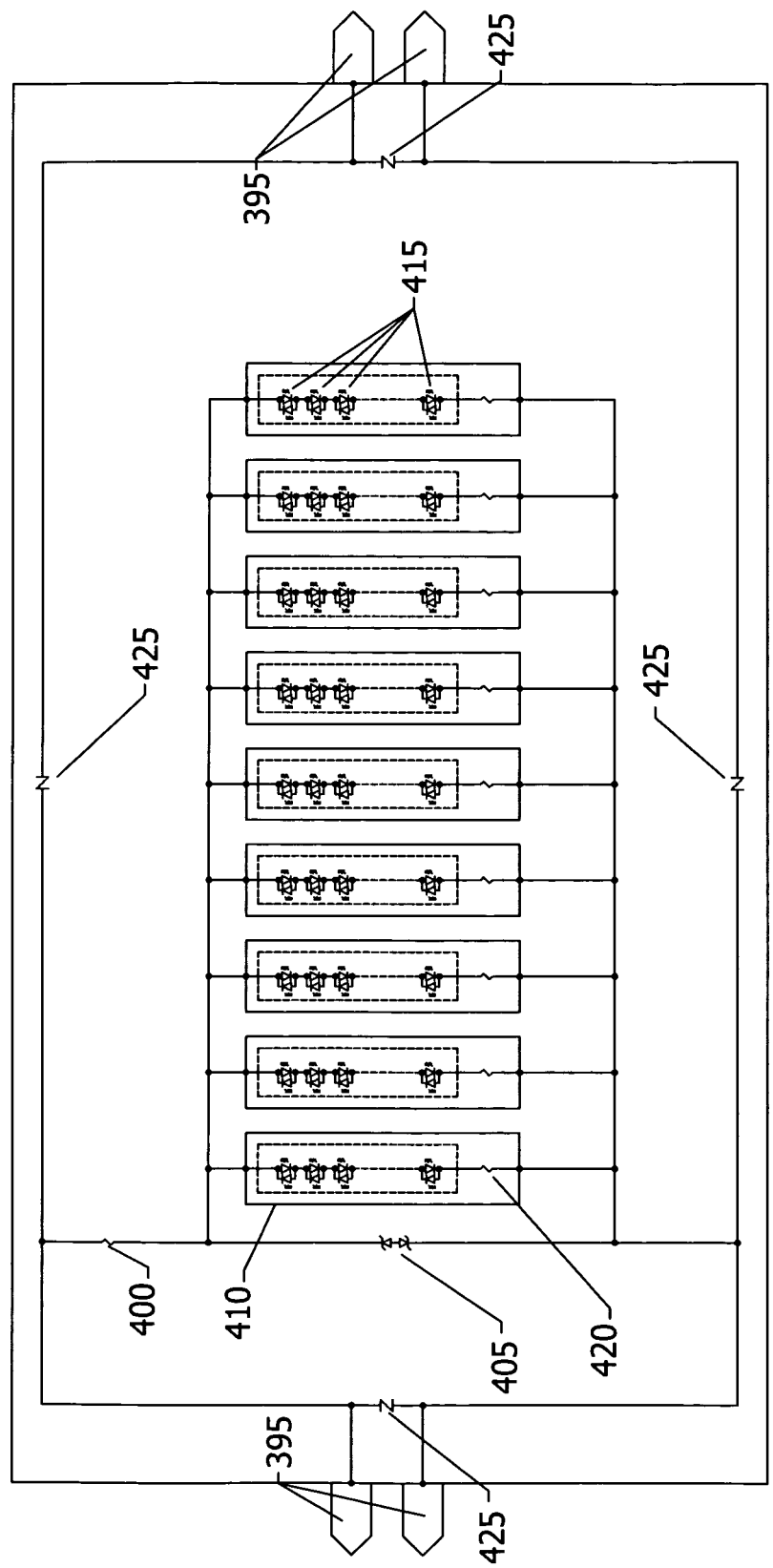
FIG. 8 shows a fourth embodiment of the present invention using a single resistor and back-to-back zener diodes as the main voltage regulating device in parallel with at least one packaged AC LED PCB consisting of at least one AC LED emitter each in series with a resistor.

FIG. 8 shows a fourth embodiment of the present invention using a high power current limiting resistor 400 and back-to-back zener diodes 405 as the main voltage regulating device to provide power to packaged AC LED PCBs 410 connected in parallel. LED lamp 390 is shown with bi-pins 395 on opposite ends of LED lamp 390. Voltage reducing devices 425 may be connected to the bi-pins 395 of LED lamp 390.

The actual voltage reducing device 425 used is a varistor. A varistor or similar fusing device may be used to ensure that voltage is limited during power surges. The actual back-to-back zener diodes 405 can also be a back-to-back avalanche breakdown diodes or a back-to-back TVS or transient voltage suppressors. Each anti-parallel diode pair 415 can consist of one diode and one LED, or both diodes can be LEDs. LED lamp 390 shows two LEDs in each anti-parallel diode pair 415. Anti-parallel diode pair 415 represents AC LED emitters with an external resistor 420. The combination of anti-parallel diode pairs 415 and resistors 420 represent the packaged AC LED PCBs 410. It is possible for the anti-parallel diode pairs 415 also to be an anti-parallel string of diode pairs (not shown) similar to the configuration shown in FIG. 7. For the sake of exposition, only four anti-parallel diode pairs 415 are shown in each packaged AC LED PCB 410. There will be at least one anti-parallel diode pair 415 in each series string connected to resistor 420 within each packaged AC LED PCB 410. It will be noted that the LED lamp 390 will still operate with input power at only one end or across any two pins on bi-pins 395.

When ballast power is connected to one or both ends of LED lamp 390 by way of bi-pins 395, the ballast power is connected to one side of high power current limiting resistor 400. The other side of resistor 400 is connected in series to the cathode side of one side of the back-to-back zener diodes 405 and to the first anti-parallel diode pairs 415 located in each packaged AC LED PCB 410. The last anti-parallel diode pair 415 is then connected to one side of resistor 420 in each packaged AC LED PCB 410. The other sides of resistors 420 and the cathode side of the other side of back-to-back zener diodes 405 are all connected back to bi-pins 395. Voltage reducing devices 425 may be connected to the bi-pins 395 of LED lamp 390.

When line voltage AC power is connected to one or both ends of LED lamp 390 by way of bi-pins 395, the line voltage AC power is connected to one side of high power current limiting resistor 400. The other side of resistor 400 is connected in series to the cathode side of one side of the back-to-back zener diodes 405 and to the first anti-parallel diode pairs 415 located in each packaged AC LED PCB 410. The last anti-parallel diode pair 415 is then connected to one side of resistor 420 in each packaged AC LED PCB 410. The other sides of resistors 420 and the cathode side of the other side of back-to-back zener diodes 405 are all connected back to bi-pins 395. Voltage reducing devices 425 may be connected to the bi-pins 395 of LED lamp 390.

When DC power is connected to one or both ends of LED lamp 390 by way of bi-pins 395, the DC power is connected to one side of high power current limiting resistor 400. The other side of resistor 400 is connected in series to the cathode side of one side of the back-to-back zener diodes 405 and to the first anti-parallel diode pairs 415 located in each packaged AC LED PCB 410. The last anti-parallel diode pair 415 is then connected to one side of resistor 420 in each packaged AC LED PCB 410. The other sides of resistors 420 and the cathode side of the other side of back-to-back zener diodes 405 are all connected back to bi-pins 395. Voltage reducing devices 425 may be connected to the bi-pins 395 of LED lamp 390.

Wireless energy transfer or wireless power transmission is the process that takes place in any system where electrical energy is transmitted from a power source to an electrical load without interconnecting wires. When power is transmitted by an inductive transmitter (not shown) located by the mating lampholders (not shown) to an inductive receiver or antenna (not shown) located in LED lamp 390, the electromagnetic induction power is connected to one side of high power current limiting resistor 400. The other side of resistor 400 is connected in series to the cathode side of one side of the back-to-back zener diodes 405 and to the first anti-parallel diode pairs 415 located in each packaged AC LED PCB 410. The last anti-parallel diode pair 415 is then connected to one side of resistor 420 in each packaged AC LED PCB 410. The other sides of resistors 420 and the cathode side of the other side of back-to-back zener diodes 405 are all connected back to bi-pins 395. Voltage reducing devices 425 may be connected to the bi-pins 395 of LED lamp 390.

Exemplary values for the relevant electrical components depicted in FIG. 8 are: resistor 400=300 ohms; each zener diode=120 volts; AC LED emitter diode pairs 415=AW3240; resistors 420=750 ohms; or packaged AC LED PCBs 410=AW3241.

It will be understood that various changes in the details, materials, types, values, and arrangements of the components that have been described and illustrated in order to explain the nature of this invention may be made by those skilled in the art without departing from the principle and scope of the invention as expressed in the following claims.

We claim:
1. An LED lamp device for use with multiple power sources comprising:
   first and second inputs for receiving power from a first power source;
   third and fourth inputs for receiving power from a second power source;
   a first voltage reducing device connected between said first and second inputs for electrical communication with said first power source;
   a second voltage reducing device between said second and third inputs;
   a third voltage reducing device between said first and fourth inputs;
   at least one voltage regulating circuit connected to said first and second inputs for providing linear current, which is not dependent on a voltage or electromagnetic induction power; and at least two LEDs connected in series across the at least one voltage regulating circuit.

2. An LED lamp device as defined in claim 1, wherein said LED lamp device is capable of use with more than one type of said power sources, said types of power sources are a ballast, mains alternating current voltage, direct current voltage and electromagnetic induction power.

3. An LED lamp device as defined in claim 1, further including an induction power receiver, said induction power receiver for receiving said electromagnetic induction power.

4. An LED lamp device as defined in claim 1, wherein said a first voltage reducing device is a first varistor.

5. An LED lamp device as defined in claim 1, wherein said a first voltage reducing device is a first capacitor.

6. An LED lamp device as defined in claim 1, wherein said a first voltage reducing device a first inductor.

7. An LED lamp device as defined in claim 1, wherein said voltage regulating circuit includes at least one voltage converting device connected across said first voltage reducing device and at least one voltage regulating device; wherein said at least one voltage regulating device is on a DC output side of said at least one voltage converting device.

8. An LED lamp device as defined in claim 7, wherein said at least one voltage converting device is at least one AC-to-DC converter.

9. An LED lamp device as defined in claim 7, wherein said at least one voltage converting device is at least one rectifier.

10. An LED lamp device as defined in claim 9, wherein said at least one rectifier is at least one full-wave diode bridge rectifier.

11. An LED lamp device as defined in claim 7, wherein said at least one voltage converting device is at least one DC-to-AC converter.

12. An LED lamp device as defined in claim 7, wherein said at least one voltage converting device is at least one inverter.

13. An LED lamp device defined in claim 1, wherein said at least one voltage regulating circuit is at least one resistor in series with at least one zener diode.

14. An LED lamp device as defined in claim 13, wherein said at least one zener diode is in parallel with at least two LEDs.

15. An LED lamp device defined in claim 1, wherein said at least one voltage regulating circuit is at least one resistor in series with at least one avalanche breakdown diode.

16. An LED lamp device defined in claim 15, wherein said at least one avalanche breakdown diode is in parallel with at least two LEDs.

17. An LED lamp device defined in claim 1, wherein said at least one voltage regulating circuit is at least one resistor in series with at least one transient voltage suppressor.

18. An LED lamp device as defined in claim 17, wherein said at least one transient voltage suppressor is in parallel with at least two LEDs.

19. An LED lamp device as defined in claim 1, wherein said at least one voltage regulating circuit is at least one voltage regulator.

20. An LED lamp device as defined in claim 19, wherein said at least one voltage regulator is at least one hybrid TV voltage regulator IC.

21. An LED lamp device as defined in claim 19, wherein said at least one voltage regulator is at least one DC-DC converter.

22. An LED lamp device as defined in claim 19, wherein said at least one voltage regulator is at least one buck converter.

23. An LED lamp device as defined in claim 1, wherein at least two LEDs are at least two high brightness LEDs.

24. An LED lamp device as defined in claim 1, wherein at least two LEDs are at least two surface mount LEDs.

25. An LED lamp device as defined in claim 1, wherein at least two LEDs are at least two OLEDs.

26. An LED lamp device as defined in claim 1, wherein one of said at least two LEDs is at least one pair of diodes consisting of one diode and one LED connected in an anti-parallel configuration.

27. An LED lamp device as defined in claim 26, further including a current limiting device in a series with said at least one pair of diodes consisting of one diode and one LED connected in an anti-parallel configuration.

28. An LED lamp device as defined in claim 27, wherein said current limiting device is a resistor.

29. An LED lamp device as defined in claim 1, wherein one of said at least two LEDs is at least one pair of diodes consisting of two LEDs connected in anti-parallel configuration.

30. An LED lamp device as defined in claim 29, further including a current limiting device in series with said at least one pair of diodes consisting of two LEDs connected in an anti-parallel configuration.

31. An LED lamp device as defined in claim 30, wherein said current limiting device is a resistor.

32. An LED lamp device as defined in claim 1, wherein one of said at least two LEDs is at least one pair of serial strings of diodes consisting of diodes and LEDs connected in an anti-parallel configuration.

33. An LED lamp device as defined in claim 32, further including a current limiting device in series with said at least one pair of serial strings of diodes consisting of diodes and LEDs connected in an anti-parallel configuration.

34. An LED lamp device as defined in claim 33, wherein said current limiting device is resistor.

35. An LED lamp device as defined in claim 1, wherein one of said at least two LEDs is at least one pair of serial strings of diodes consisting of LEDs connected in an anti-parallel configuration.

36. An LED lamp device as defined in claim 35, further including a current limiting device in series with said at least one pair of serial strings of diodes consisting of LEDs connected in an anti-parallel configuration.

37. An LED lamp device as defined in claim 36, wherein said current limiting device is a resistor.

38. An LED lamp device as defined in claim 1, wherein one of said at least two LEDs is at least one AC LED emitter.

39. An LED lamp device as defined in claim 38, further including a current limiting device in series with said at least one AC LED emitter.

40. An LED lamp device as defined claim 39, wherein said current limiting device is a resistor in series with said at least one AC LED emitter.

41. An LED lamp device as defined in claim 1, wherein at least one of said two LEDs is at least one packaged AC LED PCB.

42. An LED lamp device for use with multiple power sources comprising:
    first and second inputs for receiving power from a first power source;
    third and fourth inputs for receiving power from a second power source;
    a first voltage reducing device connected between said first and second inputs for electrical communication with said first power source;
    a second voltage reducing device between said second and third inputs;
    a third voltage reducing device between said first and fourth inputs;

at least one voltage regulating circuit connected to said first and second inputs for providing linear current, which is not dependent on a voltage or electromagnetic induction power, the at least one voltage regulating circuit includes a pair of back to back zener diodes; and at least two LEDs connected in series across the at least one voltage regulating circuit.

43. An LED lamp device as defined in claim 42, wherein said at least one voltage regulating circuit further includes at least one resistor in series with the back to back zener diodes.

* * * * *